US012743111B2

(12) United States Patent
Sakamoto et al.

(10) Patent No.: US 12,743,111 B2
(45) Date of Patent: Sep. 22, 2026

(54) CONTROL SYSTEM, CONTROL METHOD, AND NON-TRANSITORY STORAGE MEDIUM

(71) Applicant: TOYOTA JIDOSHA KABUSHIKI KAISHA, Toyota (JP)

(72) Inventors: Takumi Sakamoto, Toyota (JP); Shiro Oda, Anjo (JP); Takeshi Matsui, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 163 days.

(21) Appl. No.: 18/632,488

(22) Filed: Apr. 11, 2024

(65) Prior Publication Data

US 2024/0353870 A1 Oct. 24, 2024

(30) Foreign Application Priority Data

Apr. 19, 2023 (JP) ................................ 2023-068276

(51) Int. Cl.

*G05D 1/86* (2024.01)
*G05D 1/617* (2024.01)
*G05D 111/10* (2024.01)
*G05D 111/30* (2024.01)

(52) U.S. Cl.

CPC ............... *G05D 1/86* (2024.01); *G05D 1/617* (2024.01); *G05D 2111/10* (2024.01); *G05D 2111/30* (2024.01)

(58) Field of Classification Search

None

See application file for complete search history.

(56) References Cited

U.S. PATENT DOCUMENTS

| | | | | |
|---|---|---|---|---|
| 2015/0239436 A1* | 8/2015 | Kanai | .................... | G05D 1/021 901/1 |
| 2021/0157326 A1* | 5/2021 | Takai | .................... | G05D 1/0255 |
| 2021/0339393 A1* | 11/2021 | Dan | .......................... | B25J 5/007 |
| 2022/0041098 A1* | 2/2022 | White | .................... | A47L 9/2884 |

FOREIGN PATENT DOCUMENTS

| | | |
|---|---|---|
| JP | H07-031208 A | 2/1995 |
| JP | 2016-152003 A | 8/2016 |
| JP | 2019-526857 A | 9/2019 |
| JP | 7103689 B2 | 7/2022 |
| JP | 2023-027865 A | 3/2023 |
| WO | 2018/034686 A1 | 2/2018 |

* cited by examiner

*Primary Examiner* — Davin Seol
(74) *Attorney, Agent, or Firm* — Oliff PLC

(57) ABSTRACT

A control system controls a system including an autonomously movable mobile robot. The mobile robot includes a light-emitting unit. The mobile robot is configured to determine the traveling state of the mobile robot associated with a traveling environment of the mobile robot, and to control the light-emitting unit to emit light in different light emission patterns depending at least on whether the determination result indicates that there is an abnormality or there is no abnormality.

18 Claims, 11 Drawing Sheets

| TRAVELING STATE OF MOBILE ROBOT | FIRST LIGHT-EMITTING UNIT | SECOND LIGHT-EMITTING UNIT |
| --- | --- | --- |
| NO ABNORMALITY PRESENT | 110 140 11 | 131 120 12 |
| ABNORMALITY PRESENT | 110 140 11 | 131 120 12 |
| ABNORMALITY ELIMINATED | 110 140 11 | 131 120 12 |

FIG. 7

| TRAVELING STATE OF MOBILE ROBOT | FIRST LIGHT-EMITTING UNIT | | SECOND LIGHT-EMITTING UNIT | |
|---|---|---|---|---|
| | COLOR | TURN-ON PATTERN | COLOR | TURN-ON PATTERN |
| NO ABNORMALITY PRESENT | GREEN | ALWAYS ON | GREEN | ALWAYS ON |
| ABNORMALITY PRESENT | RED | FLASHING (SHORT INTERVALS) | GREEN | FLASHING (LONG INTERVALS) |
| ABNORMALITY ELIMINATED | BLUE | ALWAYS ON | BLUE | ALWAYS ON |

FIG. 8

| OPERATING STATE OF MOBILE ROBOT | | FIRST LIGHT-EMITTING UNIT | | SECOND LIGHT-EMITTING UNIT | |
|---|---|---|---|---|---|
| | | COLOR | TURN-ON PATTERN | COLOR | TURN-ON PATTERN |
| AUTONOMOUS MOVEMENT MODE (NORMAL) | TRAVELING AUTONOMOUSLY | GREEN | ALWAYS ON | GREEN | ALWAYS ON |
| | ON STANDBY | GREEN | BREATHING RHYTHM | GREEN | ALWAYS ON |
| | PROMPT AN OPERATION | BLUE | SEQUENTIAL LIGHTING | GREEN | ALWAYS ON |
| | ALERT | ORANGE | FLASHING (LONG INTERVALS) | GREEN | ALWAYS ON |
| USER OPERATION MODE (NORMAL) | | BLUE | SEQUENTIAL LIGHTING | ORANGE | ALWAYS ON |
| OPERATIONAL ABNORMALITY | | RED | FLASHING (SHORT INTERVALS) | RED | ALWAYS ON |

CONTROL SYSTEM, CONTROL METHOD, AND NON-TRANSITORY STORAGE MEDIUM

CROSS-REFERENCE TO RELATED APPLICATION

This application claims priority to Japanese Patent Application No. 2023-068276 filed on Apr. 19, 2023, incorporated herein by reference in its entirety.

BACKGROUND

1. Technical Field

The present disclosure relates to control systems, control methods, and non-transitory storage mediums.

2. Description of Related Art

Japanese Patent No. 7103689 (JP 7103689 B) discloses an autonomously movable mobile robot.

SUMMARY

In the mobile robot described in JP 7103689 B, when a traveling abnormality associated with a traveling environment such as contact with a wall occurs, the mobile robot cannot clearly notify the surroundings of the traveling abnormality state.

The present disclosure provides a control system, control method, and non-transitory storage medium that can clearly notify the surroundings of the traveling abnormality state when a traveling abnormality associated with a traveling environment such as contact with a wall occurs in an autonomously movable mobile robot.

A control system according to the present disclosure is a control system that controls a system including an autonomously movable mobile robot. The mobile robot includes a light-emitting unit. The control system is configured to determine a traveling state of the mobile robot associated with a traveling environment of the mobile robot, and is configured to control the light-emitting unit to emit light in different light emission patterns depending at least on whether a determination result indicates that there is an abnormality or there is no abnormality. With this configuration, when a traveling abnormality associated with the traveling environment such as contact with a wall occurs in the autonomously movable mobile robot, the control system can clearly notify the surroundings of the traveling abnormality state. In autonomous movement control, the mobile robot can be controlled to move autonomously using a learning model obtained through machine learning.

The control system may be configured to control the light-emitting unit to emit light in a first predetermined light emission pattern when the determination result indicates that there is the abnormality, and may be configured to control the light-emitting unit to emit light in a second predetermined light emission pattern when the determination result indicates that the abnormality has been eliminated. With this configuration, when a traveling abnormality associated with the traveling environment such as contact with a wall occurs, the control system can clearly notify the surroundings of the traveling abnormality state. When the traveling abnormality state is eliminated, the control system can also clearly notify the surroundings of the elimination of the traveling abnormality state.

The mobile robot may include a sensor configured to detect contact of an object with an outer periphery of the mobile robot. The control system may be configured to determine that there is the abnormality in the traveling state when the sensor detects that an object is in contact with the mobile robot, and may be configured to determine that there is no abnormality in the traveling state when the sensor does not detect that an object is in contact with the mobile robot. With this configuration, the control system can clearly notify the surroundings that an object is in contact with the mobile robot, and can also clearly notify the surroundings when the object is no longer in contact with the mobile robot.

The sensor may be a sensor configured to detect contact of an object with a bumper installed on the outer periphery of the mobile robot. With this configuration, the control system can protect with the bumper a body of the mobile robot and the object that has come into contact with the bumper.

The control system may be configured to stop movement of the mobile robot when the determination result indicates that there is the abnormality. With this configuration, the control system can stop the movement of the mobile robot when there is an abnormality in the traveling state. It is therefore possible to prevent the worse from happening.

The system may include a server that is connectable to the mobile robot via wireless communication. The server may be configured to, at least when the server is unable to communicate with the mobile robot, determine, based on an image of the mobile robot captured by a camera, the traveling state of the mobile robot from a light emission pattern shown by the image. With this configuration, the server of the control system can determine whether a traveling abnormality associated with the traveling environment has occurred, even when the mobile robot and the server are unable to communicate with each other.

A control method according to the present disclosure is a control method for controlling a system that includes an autonomously movable mobile robot including a light-emitting unit. The control method includes: determining a traveling state of the mobile robot associated with a traveling environment of the mobile robot; and controlling the light-emitting unit to emit light in different light emission patterns depending at least on whether a determination result indicates that there is an abnormality or there is no abnormality. With this configuration, when a traveling abnormality associated with the traveling environment such as contact with a wall occurs in the autonomously movable mobile robot, the control method can clearly notify the surroundings of the traveling abnormality state.

The control method may further include controlling the light-emitting unit to emit light in a first predetermined light emission pattern when the determination result indicates that there is the abnormality, and controlling the light-emitting unit to emit light in a second predetermined light emission pattern when the determination result indicates that the abnormality has been eliminated. With this configuration, when a traveling abnormality associated with the traveling environment such as contact with a wall occurs, the control method can clearly notify the surroundings of the traveling abnormality state. When the traveling abnormality state is eliminated, the control method can also clearly notify the surroundings of the elimination of the traveling abnormality state.

The mobile robot may include a sensor configured to detect contact of an object with an outer periphery of the mobile robot. The control method may further include determining that there is the abnormality in the traveling state when the sensor detects that an object is in contact with the mobile robot, and determining that there is no abnormality in the traveling state when the sensor does not detect that an object is in contact with the mobile robot. With this configuration, the control method can clearly notify the surroundings that an object is in contact with the mobile robot, and can also clearly notify the surroundings when the object is no longer in contact with the mobile robot.

The sensor may be a sensor configured to detect contact of an object with a bumper installed on the outer periphery of the mobile robot. With this configuration, the control method can protect with the bumper a body of the mobile robot and the object that has come into contact with the bumper.

The control method may further include stopping movement of the mobile robot when the determination result indicates that there is the abnormality. With this configuration, the control method can stop the movement of the mobile robot when there is an abnormality in the traveling state. It is therefore possible to prevent the worse from happening.

The system may include a server that is connectable to the mobile robot via wireless communication. The control method may further include at least when the server is unable to communicate with the mobile robot, determining, based on an image of the mobile robot captured by a camera, the traveling state of the mobile robot from a light emission pattern shown by the image. With this configuration, the control method can determine whether a traveling abnormality associated with the traveling environment has occurred, even when the mobile robot and the server are unable to communicate with each other.

A non-transitory storage medium according to the present disclosure is a non-transitory storage medium storing instructions that are executable by one or more processors and that cause the one or more processors to perform a process for controlling a system that includes an autonomously movable mobile robot including a light-emitting unit. The process includes a determination process for determining a traveling state of the mobile robot associated with a traveling environment of the mobile robot, and a light emission process for controlling the light-emitting unit to emit light in different light emission patterns depending at least on whether a determination result in the determination process indicates that there is an abnormality or there is no abnormality. With this configuration, when a traveling abnormality associated with the traveling environment such as contact with a wall occurs in the autonomously movable mobile robot, the non-transitory storage medium can clearly notify the surroundings of the traveling abnormality state.

The light emission process may control the light-emitting unit to emit light in a first predetermined light emission pattern when the determination result indicates that there is the abnormality, and may control the light-emitting unit to emit light in a second predetermined light emission pattern when the determination result indicates that the abnormality has been eliminated. With this configuration, when a traveling abnormality associated with the traveling environment such as contact with a wall occurs, the non-transitory storage medium can clearly notify the surroundings of the traveling abnormality state. When the traveling abnormality state is eliminated, the non-transitory storage medium can also clearly notify the surroundings of the elimination of the traveling abnormality state.

The mobile robot may include a sensor configured to detect contact of an object with an outer periphery of the mobile robot. The determination process may determine that there is the abnormality in the traveling state when the sensor detects that an object is in contact with the mobile robot, and may determine that there is no abnormality in the traveling state when the sensor does not detect that an object is in contact with the mobile robot. With this configuration, the non-transitory storage medium can clearly notify the surroundings that an object is in contact with the mobile robot, and can also clearly notify the surroundings when the object is no longer in contact with the mobile robot.

The sensor may be a sensor configured to detect contact of an object with a bumper installed on the outer periphery of the mobile robot. With this configuration, the non-transitory storage medium can protect with the bumper a body of the mobile robot and the object that has come into contact with the bumper.

The process may include a stopping process for stopping movement of the mobile robot when the determination result indicates that there is the abnormality. With this configuration, the non-transitory storage medium can stop the movement of the mobile robot when there is an abnormality in the traveling state. It is therefore possible to prevent the worse from happening.

In above embodiment of the non-transitory storage medium, the system may include a server that is connectable to the mobile robot via wireless communication. The mobile robot may be configured to control the light-emitting unit to emit light in different light emission patterns depending at least on whether a determination result of a traveling state of the mobile robot associated with a traveling environment of the mobile robot indicates that there is an abnormality or there is no abnormality. The determination process may include at least when the server is unable to communicate with the mobile robot, determining, based on an image of the mobile robot captured by a camera, the traveling state of the mobile robot from a light emission pattern shown by the image. With this configuration, the non-transitory storage medium can determine whether a traveling abnormality associated with the traveling environment has occurred, even when the mobile robot and the server are unable to communicate with each other.

The present disclosure can provide the control system, control method, and non-transitory storage medium that can clearly notify the surroundings of the traveling abnormality state when a traveling abnormality associated with a traveling environment such as contact with a wall occurs in an autonomously movable mobile robot.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 7 shows another example of the light emission patterns that can be implemented by the mobile robot of FIG. 1;

FIG. 8 shows still another example of the light emission patterns that can be implemented by the mobile robot of FIG. 1;

DETAILED DESCRIPTION OF EMBODIMENTS

Hereinafter, the present disclosure will be described based on an embodiment of the disclosure. However, the disclosure according to the claims is not limited to the following embodiment. All the configurations described in the embodiment are not necessarily essential as means.

EMBODIMENT

Figure 1:
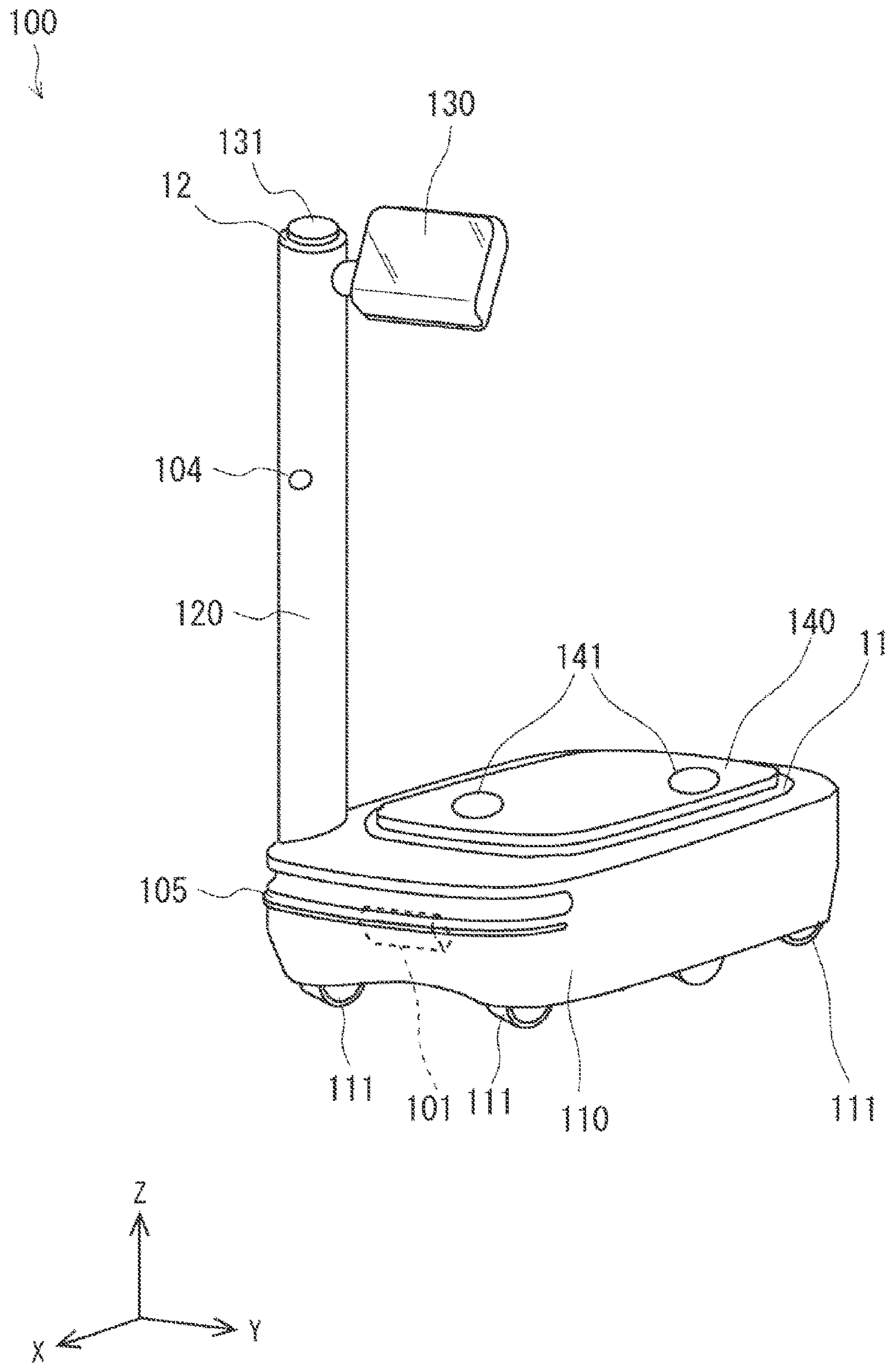
FIG. 1 is a perspective view showing an example of the overall configuration of a mobile robot according to an embodiment.
Figure 2:
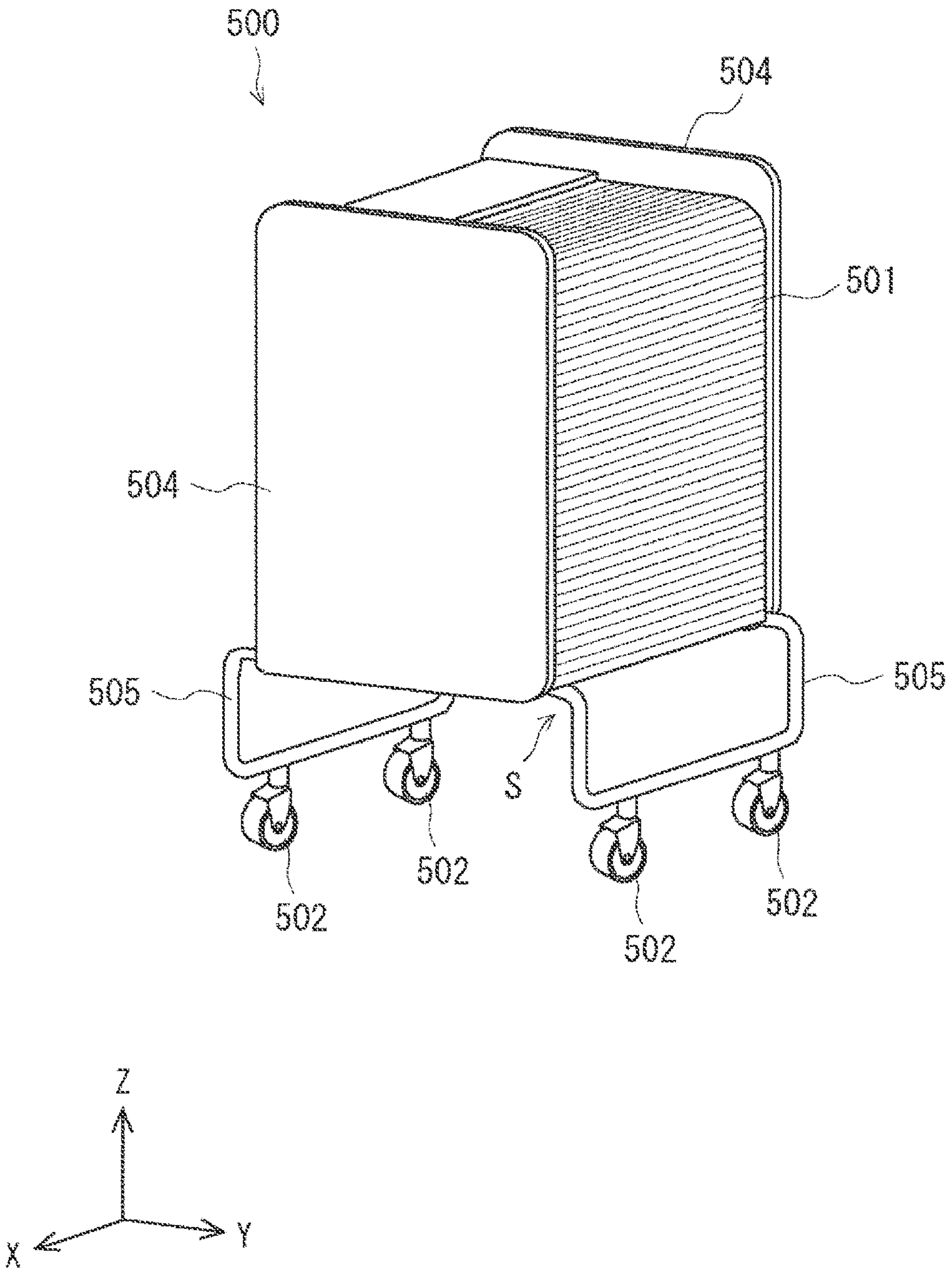
FIG. 2 is a perspective view showing an example of the overall configuration of a wagon transported by the mobile robot of FIG. 1.

A control system according to the embodiment performs system control for controlling a system including an autonomously movable mobile robot. This mobile robot can be configured to transport an object. Although such an example will be given below, the mobile robot may not be configured to transport an object. In the case where the mobile robot is configured to transport an object, the mobile robot can also be referred to as a transport robot, and the system including the mobile robot can also be referred to as a transport system. An example of the configuration of the mobile robot according to the present embodiment will be described below with reference to FIGS. 1 and 2. FIG. 1 is a perspective view showing an example of the overall configuration of the mobile robot according to the present embodiment, and FIG. 2 is a perspective view showing an example of the overall configuration of a wagon transported by the mobile robot of FIG. 1.

The above system such as the transport system need only include a mobile robot such as a mobile robot 100 shown in FIG. 1, but may further include other devices such as a host management device. For simplicity of description, an example will first be given in which the transport system is composed of the mobile robot 100 alone. The main characteristics of the transport system will be described. In this example, the control system can refer to either the mobile robot 100 itself or components of a control system in the mobile robot 100.

In the following description, an XYZ orthogonal coordinate system will be used as appropriate. An X direction is a front-rear direction of the mobile robot 100, a Y direction is a left-right direction, and a Z direction is a vertical up-down direction shown in FIG. 1. More specifically, a +X direction is defined as a forward direction of the mobile robot 100, and a −X direction is defined as a rearward direction of the mobile robot 100. A +Y direction is a leftward direction of the mobile robot 100, and a −Y direction is a rightward direction of the mobile robot 100. A +Z direction is a vertically upward direction, and a-Z direction is a vertically downward direction.

The mobile robot 100 can move in both the forward and rearward directions. That is, the mobile robot 100 moves in the forward direction when its wheels are rotated forward, and moves in the rearward direction when the wheels are rotated in reverse. Changing the rotational speed between the right and left wheels allows the mobile robot 100 to turn right or left.

As shown in FIG. 1, the mobile robot 100 can include a platform 110 on which an object to be transported (hereinafter also referred to as a transport object) is to be loaded, a stand 120, and an operation unit 130. The platform 110 is equipped with wheels 111, axles, a battery, a control computer 101, a drive motor, etc. It is herein assumed that the control computer 101 is mounted at the illustrated position in the platform 110. However, the control computer 101 need not necessarily mounted at this position. The control computer 101 may be mounted at any other position in the platform 110, or part of the control computer 101 or the entire control computer 101 may be mounted in either or both of the stand 120 and the operation unit 130.

The platform 110 rotatably holds the wheels 111. In the example of FIG. 1, the platform 110 is provided with four wheels 111. The four wheels 111 are right and left front wheels, and right and left rear wheels. The mobile robot 100 moves along a desired route by independently controlling the rotational direction and rotational speed of the wheels 111. Part of the four wheels 111 may be drive wheels, and the rest of the wheels 111 may be driven wheels. As shown in FIG. 1, an additional driven wheel(s) may be provided between the front and rear wheels 111.

In order to, for example, prevent contact with obstacles and check the route, various sensors such as a camera and a distance sensor may be provided on at least one of the following components: the platform 110, the operation unit 130, and the stand 120.

FIG. 1 illustrates an example in which a camera 104 and a sensor 105 are provided as such sensors. The camera 104 is provided on the stand 120 so as to face the +X side, and the sensor 105 is provided on the front side of the platform 110. A bumper may be installed on the front side of the platform 110, and the sensor 105 may be mounted on the bumper. The sensor 105 detects when an object comes into contact with the bumper. The mobile robot 100 can be controlled to stop when the sensor 105 detects contact of an object, that is, contact of an obstacle. Therefore, the sensor 105 can be referred to as a stop sensor. The sensor 105 need not necessarily be mounted on the front side. The sensor 105 may be a sensor that detects contact of an object with a bumper installed on part or all of the outer periphery of the mobile robot 100. The sensor 105 may be configured to also detect the contact position of the object on the installed bumper.

The mobile robot 100 is an autonomous mobile robot. However, the mobile robot 100 may have a function to move according to user's operations. That is, the mobile robot 100 may be a mobile robot configured to switch between the autonomous movement mode and the user operation mode. By the autonomous movement control, the mobile robot 100 can be controlled to move autonomously based on a route determined according to a set transport destination or a set route. In the autonomous movement control, the mobile robot 100 can also be controlled to move autonomously by determining a route, performing contact avoidance, etc. using a learning model obtained through machine learning.

The user operation mode in which the mobile robot 100 moves based on user operations may be any mode as long as the degree of involvement of the user operations is relatively high compared to the autonomous movement mode in which the mobile robot 100 moves autonomously. In other words, the user operation mode need not be limited to a mode in which the user controls all movements of the mobile robot with no autonomous control by the mobile robot. Similarly, the autonomous movement mode need not be limited to a mode in which the mobile robot performs fully autonomous control and does not accept any user operations. For example, the user operation mode and the autonomous movement mode may include the following first to third examples.

In the first example, the autonomous movement mode is a mode in which the mobile robot travels autonomously and determines when to stop and when to start traveling and the user does not perform any operations, and the user operation mode is a mode in which the mobile robot travels autonomously and the user operates to stop the mobile robot and to control the mobile robot to start traveling. In the second example, the autonomous movement mode is a mode in which the mobile robot travels autonomously and the user operates to stop the mobile robot and to control the mobile robot to start traveling, and the user operation mode is a mode in which the mobile robot does not travel autonomously and the user not only operates to stop the mobile robot and to control the mobile robot to start traveling but also operates to control the mobile robot to travel. In the third example, the autonomous movement mode is a mode in which the mobile robot travels autonomously and determines when to stop and when to start traveling and the user does not perform any operations, and the user operation mode is a mode in which the mobile robot travels autonomously for speed adjustment, contact avoidance, etc. and the user operates to change the direction of travel and the route etc.

For example, the user may be a worker at a facility where the mobile robot 100 is utilized. When the facility is a hospital, the user may be a hospital worker.

The control computer 101 can be implemented by, for example, integrated circuitry, and can be implemented by, for example, a processor such as a micro processor unit (MPU) or a central processing unit (CPU), a working memory, and a nonvolatile storage device. Control programs to be executed by the processor are stored in the storage device, and the processor can perform the function to control the mobile robot 100 by reading the programs into the working memory and executing them. The control computer 101 can be referred to as a control unit.

The control computer 101 controls the mobile robot 100 to move autonomously toward a preset transport destination or along a preset transport route, based on prestored map data and information acquired by the various sensors such as the camera 104. This autonomous movement control can include control for loading a wagon 500 shown in FIG. 2 and control for unloading the wagon 500. The wagon 500 will be described later. It can be said that the control computer 101 includes a movement control unit that performs such autonomous movement control.

In order to load and unload a transport object such as the wagon 500, the platform 110 can include a lifting mechanism 140 for loading and unloading a transport object. Part of the lifting mechanism 140 can be housed inside the platform 110. The lifting mechanism 140 can be installed on the upper surface side of the platform 110 with its loading surface, namely its surface on which a transport object is to be loaded, being exposed. The lifting mechanism 140 is a lifting stage configured to be raised and lowered, and can be raised and lowered as controlled by the control computer 101. The platform 110 is provided with a motor and a guide mechanism that are for the raising and lowering of the lifting mechanism 140. An upper surface of the lifting mechanism 140 serves as the loading surface on which the wagon 500 as a transport object is to be loaded. The wagon 500 is not limited to the configuration shown in FIG. 2, and may be any predetermined wagon of a size, shape, and weight that are loadable and transportable on the lifting mechanism 140. The lifting mechanism 140 includes a lift mechanism for lifting the wagon 500. Space above the lifting mechanism 140 serves as a loading space for loading a transport object. As far as the user loads the wagon 500, the platform 110 may not include the lifting mechanism 140.

The platform 110 can include a first light-emitting unit 11 at a position surrounding the lifting mechanism 140. The first light-emitting unit 11 may have any configuration as long as it can emit light. The first light-emitting unit 11 may be composed of, for example, one or more light-emitting diodes (LEDs) or organic electroluminescence, and its light emission can be controlled by the control computer 101. The position, shape, and size of the first light-emitting unit 11 are not limited to those illustrated in the drawings. The mobile robot 100 can include the first light-emitting unit 11 even when the mobile robot 100 does not include the lifting mechanism 140.

The stand 120 is attached to the platform 110. The stand 120 is a rod-shaped member extending upward from the platform 110. The stand 120 is in a cylindrical shape that is long in the Z direction. However, the stand 120 may be in any shape, and the mobile robot 100 may not include the stand 120. The longitudinal direction of the stand 120 is parallel to the Z direction. The stand 120 is installed outside the lifting mechanism 140. That is, the stand 120 is installed so as not to interfere with the rising and lowering movements of the lifting mechanism 140. The stand 120 is installed on one end side in the Y direction (right-left direction) of the platform 110. The stand 120 is attached near the right front corner of the platform 110. The stand 120 is provided at the end of the platform 110 that is located on the +X side and −Y side on an XY plane.

The stand 120 may be provided with, for example, a stick unit 131 of a joystick device or an emergency stop button for stopping the mobile robot 100 in case of emergency, on its upper surface portion. The joystick device is a device that is operated to move the mobile robot 100 in a direction intended by the user when in the user operation mode. The joystick device can receive a directional operation when the stick unit 131 is tilted in a direction in which the user wants the mobile robot 100 to move. The joystick device can also be controlled to perform a select operation by pressing down the stick unit 131. The stick unit 131 may be configured to serve as an emergency stop button when it is pressed down for a predetermined period. In the case where the stick unit 131 is configured to also receive a select operation, this predetermined period need only be set to a different value from a period for the select operation.

The stand 120 can include a second light-emitting unit 12 at a position surrounding the stick unit 131. The second light-emitting unit 12 may have any configuration as long as it can emit light. For example, the second light-emitting unit 12 may be composed of, for example, one or more LEDs or organic electroluminescence, and its light emission can be controlled by the control computer 101. The position, shape, and size of the second light-emitting unit 12 are not limited to those illustrated in the drawings. The mobile robot 100 can include the second light-emitting unit 12 even when the mobile robot 100 does not include the stand 120 or even when the mobile robot 100 includes the stand 120 but does not include the stick unit 131.

The stand 120 supports the operation unit 130. The operation unit 130 is attached near the upper end of the stand 120. The operation unit 130 can thus be installed at a height that is easy for the user to operate. That is, the stand 120 extends to a height that is easy for the standing user to operate, and the stick unit 131 is also installed at a height that is easy for the user to operate. The operation unit 130 extends to the +Y side from the stand 120. From the standpoint of case of operation, the operation unit 130 may be mounted in the middle in the right-left direction of the platform 110.

The operation unit 130 can include a touch panel monitor etc. that receives user operations. The operation unit 130 may also include a microphone for voice input, etc. The monitor of the operation unit 130 faces the opposite side from the platform 110. That is, a display surface (operation surface) of the operation unit 130 is a surface on the +X side of the operation unit 130. The operation unit 130 may be detachable from the stand 120. That is, a holder that holds the touch panel may be attached to the stand 120. The user can enter a transport destination of a transport object, transport information about the transport object, etc. by operating the operation unit 130. The operation unit 130 can display, to the user, information such as details of an object being transported or an object to be transported and a destination of the object. The mobile robot 100 may not include the operation unit 130.

As shown in the figures, the operation unit 130 and the stick unit 131 can be mounted at at least about the same height so that they can be operated intuitively. This allows the user to operate the operation unit 130 and the stick unit 131 in an intuitive flow even in the case where the operation of pressing down the stick unit 131 is assigned to an operation of selecting an operation displayed on the operation unit 130.

An integrated circuit (IC) card reader for the user to get authenticated using an IC card etc. may be installed on the stand 120 at about the same height position as the operation unit 130 or inside the operation unit 130. Although the mobile robot 100 need not necessarily have a user authentication function, the mobile robot 100 with the user authentication function can block mischievous operations by a third party etc. The user authentication function is not limited to the type using an IC card, and may be of the type using user information and a password that are entered via the operation unit 130. However, the user authentication function of the type using various short-range wireless communication technologies that allow contactless authentication can save the user a hassle and can prevent infection.

The user can request such a mobile robot 100 to put a transport object in the wagon 500 placed on the mobile robot 100 and transport the transport object. The wagon 500 itself can also be referred to as a transport object. Therefore, for convenience, a transport object that is put in the wagon 500 will be hereinafter referred to as an article in order to distinguish between them. The mobile robot 100 transports the wagon 500 by autonomously moving to a set destination. That is, the mobile robot 100 performs the task of transporting the wagon 500. In the following description, a location where the wagon 500 is loaded will also be referred to as a transport origin or a loading location, and a location to which the wagon 500 is delivered will also be referred to as a transport destination or a destination.

For example, it is assumed that the mobile robot 100 moves around a general hospital with a plurality of clinical departments. The mobile robot 100 transports an article such as equipment, consumables, and medical equipment between the clinical departments. For example, the mobile robot 100 delivers an article from a nurses' station of one clinical department to a nurses' station of another clinical department. Alternatively, the mobile robot 100 delivers an article from a storage of equipment or medical equipment to a nurses' station of a clinical department. The mobile robot 100 also delivers medicine dispensed in a dispensing department to a clinical department or patient expected to use the medicine.

Figure 3:
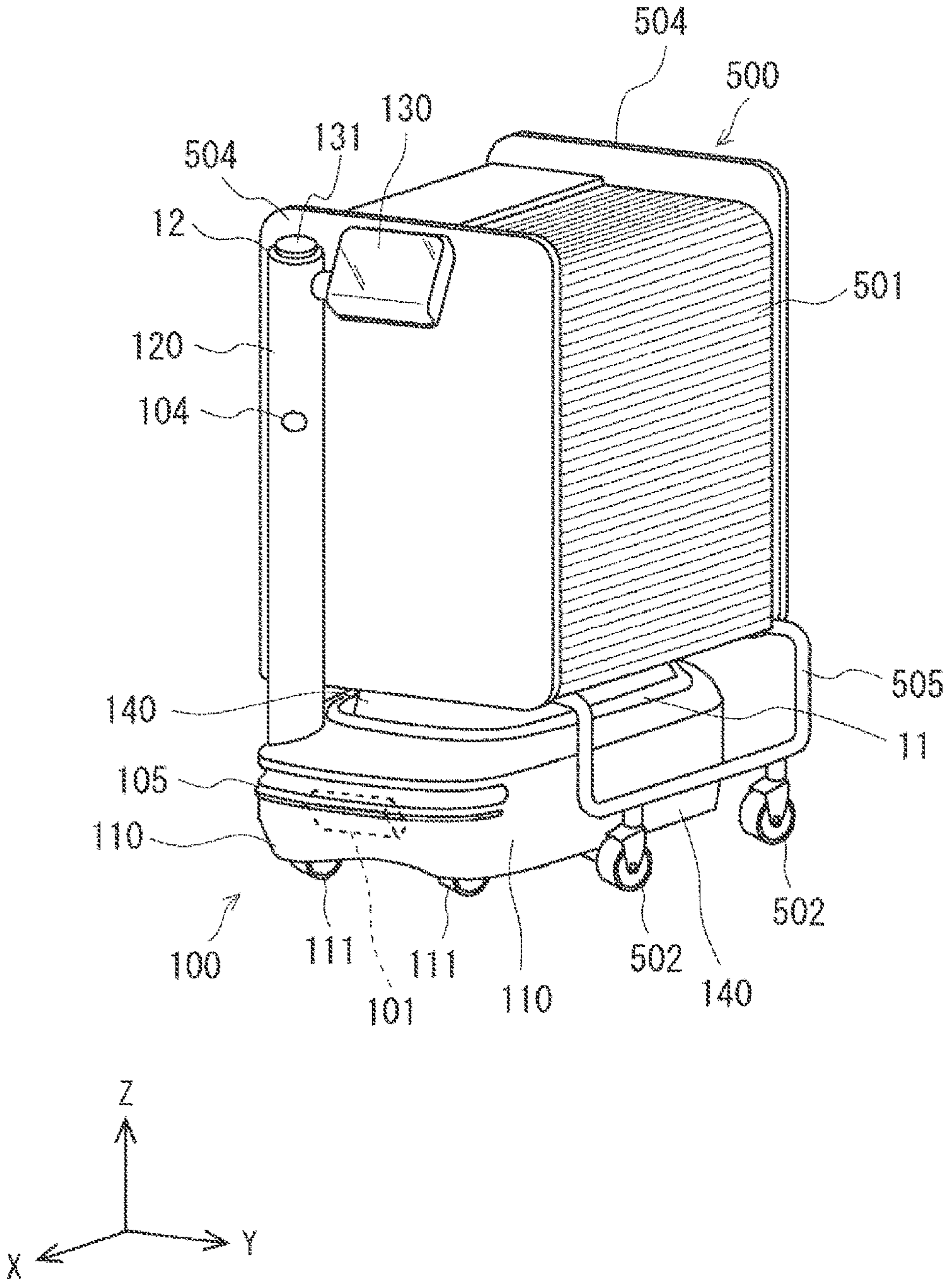
FIG. 3 is a perspective view showing the mobile robot of FIG. 1 transporting the wagon of FIG. 2.

Examples of the article include medicines, consumables such as bandages, specimens, test equipment, medical equipment, hospital foods, and equipment such as stationery. Examples of the medical equipment include sphygmomanometers, blood transfusion pumps, syringe pumps, foot pumps, nurse call buttons, bed leaving sensors, low-pressure continuous suction devices, electrocardiogram monitors, infusion controllers, enteral feeding pumps, ventilators, cuff pressure gauges, touch sensors, inhalers, nebulizers, pulse oximeters, artificial resuscitators, aseptic isolators, and ultrasound diagnostic equipment. The mobile robot 100 may transport meals such as hospital foods and foods for a special diet a patient follows to prepare for a test may be transported. The mobile robot 100 may transport used equipment, used tableware, etc. When the transport destination is on a different floor, the mobile robot 100 may take an elevator etc. to move to the transport destination Next, details of the wagon 500 and an example of how the mobile robot 100 holds the wagon 500 will be described with reference to FIGS. 2 and 3. FIG. 3 is a perspective view illustrating how the mobile robot 100 transports the wagon 500.

The wagon 500 includes a storage portion configured to store an article, and a support portion supporting the storage portion with a space below the storage unit for at least part of the platform 110 to enter. As shown in FIG. 2, the storage portion can include side plates 504 on both sides of the wagon 500 and a cover 501 that can be opened and closed. When the user opens the cover 501, an article loaded into the wagon 500 can be unloaded from the wagon 500. As shown in FIG. 2, the support portion can include a support frame 505 supporting the storage portion, and wheels 502 attached to the lower side of the support frame 505. The wheels 502 may be provided with a cover, not shown.

The wagon 500 can be held by the lifting mechanism 140 of the mobile robot 100 as described above. The lifting mechanism 140 is a mechanism for loading and unloading the wagon 500 as a transport object onto and from the upper surface side of at least part of the platform 110. Since the mobile robot 100 includes the lifting mechanism 140, the mobile robot 100 can easily automatically transport the wagon 500.

As shown in FIG. 3, the mobile robot 100 can hold the wagon 500 by the lifting mechanism 140. The space for at least part of the platform 110 to enter is a space S below the wagon 500 shown in FIG. 2. This space S serves as a space the platform 110 enters. In other words, the platform 110 can enter the space S directly below the wagon 500. When loading the wagon 500 onto the platform 110, the mobile robot 100 moves in the −X direction and enters directly below the wagon 500. The platform 110 enters directly below the wagon 500 from the side in the front-rear direction on which the stand 120 is not installed. The wagon 500 can thus be loaded without the stand 120 interfering with the wagon 500. In other words, the stand 120 can be attached to near the corner of the platform 110 so as not to interfere with the wagon 500.

As shown in FIG. 1, a contact portion of the lifting mechanism 140 that contacts the bottom surface of the wagon 500 by, for example, coupling or connection when the wagon 500 loaded on the lifting mechanism 140 is transported may have recesses 141. This contact portion may be the upper surface of the lifting mechanism 140. The wagon 500 may have protrusions, not shown, on the lower side of the storage portion. The wagon 500 can be fixed to the mobile robot 100 by fitting the protrusions into the recesses 141.

Although the wagon 500 is illustrated as a dolly with the wheels 502, the form and configuration of the wagon 500 is not particularly limited. The predetermined wagon illustrated as the wagon 500 may be any wagon as long as it has a shape, size, and weight that are transportable by the mobile robot 100.

The operations of loading the wagon 500, transporting the wagon 500 to a transport destination, and unloading the wagon 500 by the mobile robot 100 will be described. First, regarding the loading of the wagon 500, the mobile robot 100 can be a mobile robot that is set in advance to transport the wagon 500 and searches for the wagon 500 or moves to a known position. For example, the wagon 500 whose position is specified by the user can be assigned to the mobile robot 100 as an object to be transported or an object to be searched for, and the mobile robot 100 can autonomously move in order to transport the wagon 500. Alternatively, the mobile robot 100 may automatically transport the wagon 500 to a transport destination when it finds the wagon 500 on a return route after finishing a task of transporting another wagon or an article. The present disclosure is not limited to these examples, and various methods can be applied to the utilization of the mobile robot 100 for transport of the wagon 500.

The mobile robot 100 moves to the position of the wagon 500, and the control computer 101 recognizes the wagon 500 based on information acquired by the camera 104 or other sensor, and controls the lifting mechanism 140 to load the wagon 500. This control to load the wagon 500 can also be referred to as pickup control.

In the pickup control, the platform 110 is first controlled to enter the space S directly below the wagon 500, and when the entry is completed, the lifting mechanism 140 is raised. The lifting stage that is the upper surface of the lifting mechanism 140 thus comes into contact with the wagon 500, so that the lifting mechanism 140 can lift the wagon 500. That is, as the lifting mechanism 140 rises, the wheels 502 are lifted off the floor surface, and the wagon 500 is loaded onto the platform 110. The mobile robot 100 is thus docked with the wagon 500 and becomes ready to head to the transport destination. The control computer 101 then controls driving of the wheels 111 etc. so that the mobile robot 100 moves autonomously along a set route. The mobile robot 100 thus transports the wagon 500 to the transport destination.

The mobile robot 100 moves to the transport destination of the wagon 500, and the control computer 101 controls the lifting mechanism 140 to unload the wagon 500. In this control, the lifting mechanism 140 is lowered in order to unload the wagon 500 from the platform 110. The wheels 502 come into contact with the floor surface, and the upper surface of the lifting mechanism 140 is separated from the wagon 500. The wagon 500 is thus placed on the floor surface. The wagon 500 can be unloaded from the platform 110 in this manner.

The above various examples are given on the assumption that the mobile robot 100 transports a wagon such as the wagon 500 as a transport object. However, even in the case where the mobile robot 100 is configured to transport a wagon, the mobile robot 100 may be utilized to transport an individual article (item) as a transport object. In that case, it is preferable to attach a storage box or a shelf to the mobile robot 100 so that the article will not fall while the mobile robot 100 is moving.

There are situations where the mobile robot 100 is utilized to transport a plurality of articles and it is necessary to transport the articles to a plurality of transport destinations. In this case, regardless of whether the mobile robot 100 uses the wagon 500 to transport the articles, the user can unload the articles at the transport destinations. The mobile robot 100 can transport a wagon or an individual article(s) by autonomously moving to a set destination or by moving according to user's operations.

Figure 4:
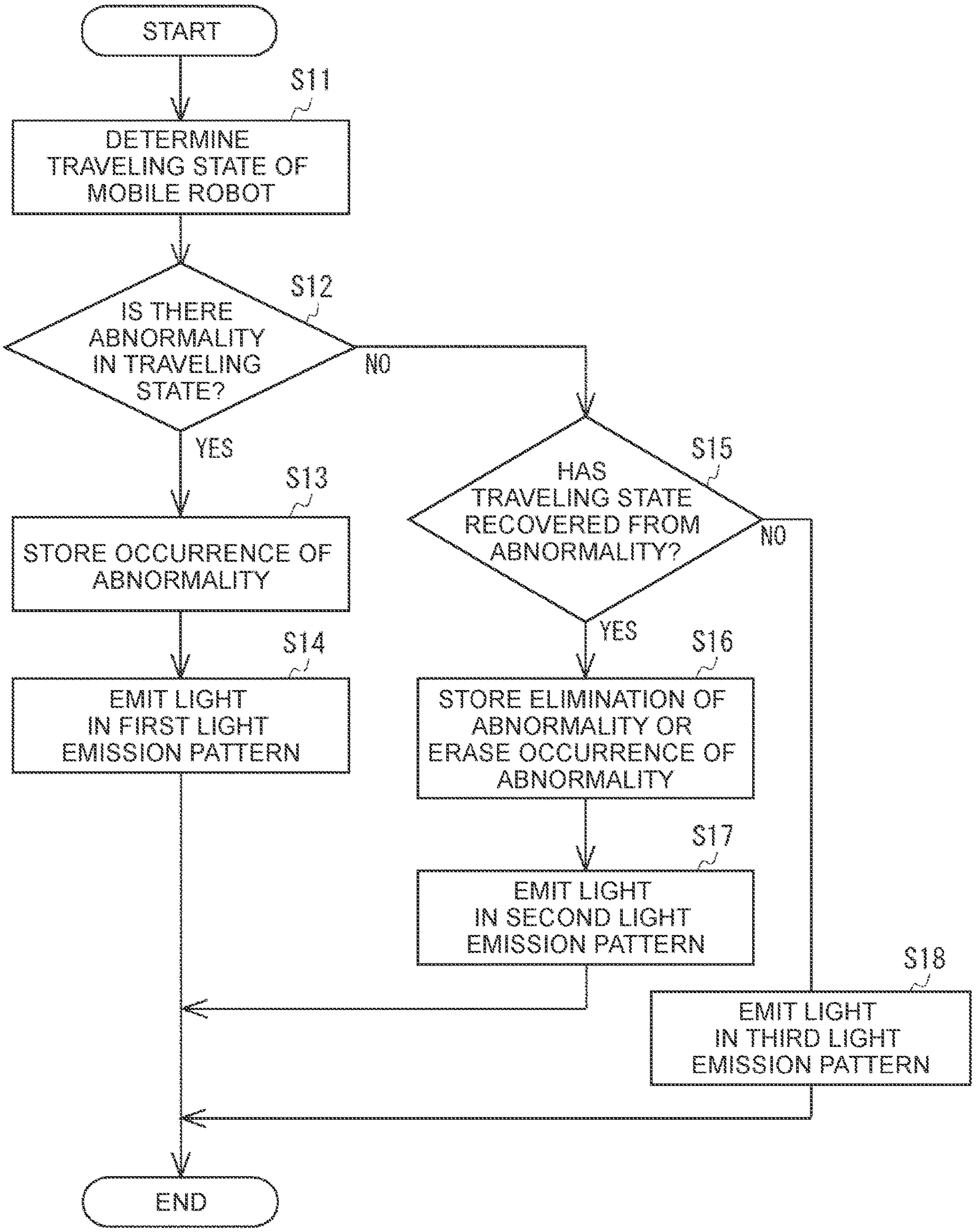
FIG. 4 is a flowchart illustrating an example of a light emission process that is performed by the mobile robot of FIG. 1.
Figure 5:
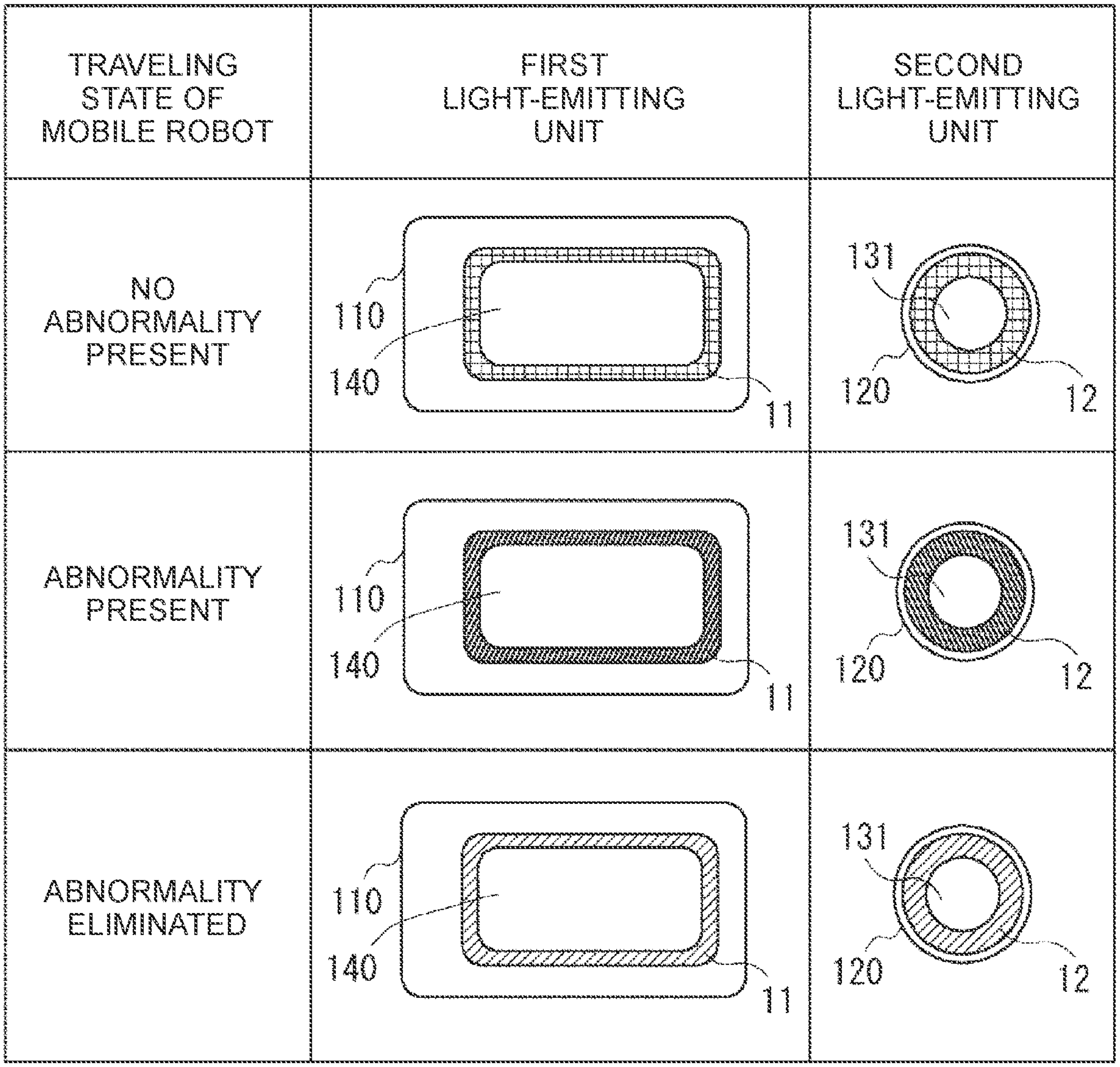
FIG. 5 shows an example of light emission patterns that can be implemented by the mobile robot of FIG. 1.

Next, an example of the main characteristics of the present embodiment will be described with reference to FIGS. 4 and 5. FIG. 4 is a flowchart illustrating an example of a light emission process that is performed by the mobile robot 100. FIG. 5 shows an example of light emission patterns that can be implemented by the mobile robot 100.

As a main characteristic of the present embodiment, the mobile robot 100 includes light-emitting units like the first light-emitting unit 11 and the second light-emitting unit 12. An example in which the mobile robot 100 includes light-emitting units at two positions will be described below. However, the mobile robot 100 may include a light-emitting unit at one position or may include light-emitting units at three or more positions, and the position, shape, and size of each light-emitting unit are not limited to the illustrated example. From the viewpoint of visibility from the surrounding area, it is preferable that light-emitting units be mounted at a plurality of positions away from each other, like the first light-emitting unit 11 and the second light-emitting unit 12.

As part of the system control described above, the control computer 101 determines the traveling state of the mobile robot 100 associated with the traveling environment of the mobile robot 100, and controls the light-emitting units, such as the first light-emitting unit 11 and the second light-emitting unit 12, to emit light in different light emission patterns depending at least on whether the determination result indicates that there is an abnormality or there is no abnormality. The traveling state can refer to whether an abnormality associated with the traveling environment of the mobile robot 100, such as contact with a wall, has occurred. Since the abnormality herein is based on the above determination of the traveling state, the abnormality can be referred to as a traveling abnormality. The light emission patterns can also be referred to as light emission forms.

The determination of the traveling state can be made by the control computer 101 performing information processing, image processing, etc. based on the detection results from the sensors such as the sensor 105. The following description is given on the assumption that the determination is made in this way. Each sensor may perform such detection that the result of the detection indicates the determination result itself of the traveling state, or may have a function to determine the traveling state by performing information processing, image processing, etc. based on its sensing result. In that case, each sensor sends its determination result to the control computer 101, and the control computer 101 can use the information received from each sensor as the determination result of the traveling state. The determination of the traveling state may be made by a determination unit provided separately from the control computer 101 that performs light emission control.

As described above, the control computer 101 need only control the light-emitting units, such as the first light-emitting unit 11 and the second light-emitting unit 12, to emit light in different light emission patterns depending at least on whether the determination result indicates that there is an abnormality or there is no abnormality.

Therefore, the control computer 101 may merely control light emission so that light is emitted in different light emission patterns depending on whether the determination result indicates that there is an abnormality or there is no abnormality. Alternatively, for example, the determination may be made to indicate even the degree of abnormality (abnormality level). That is, the degree of abnormality may be quantitatively or qualitatively obtained and may be used as the determination result. The control computer 101 can then control light emission so that light is emitted in different light emission patterns depending on the degree of abnormality indicated by the determination result. To "control light emission so that light is emitted in different light emission patterns depending on the degree of abnormality" means to determine the light emission pattern corresponding to the degree of abnormality indicated by the determination result out of a plurality of light emission patterns and control light emission so that light is emitted in the determined light emission pattern.

For example, the degree of abnormality can be determined so that the more likely a traveling abnormal is expected to occur, the higher the degree of abnormality indicated by the determination result is. For example, the degree of abnormality can be determined to be higher as the number of factors that affect the traveling state due to the traveling environment increases. Alternatively, the degree of abnormality may be determined so as to correspond to the degree of at least one of these factors. For example, when the determination of the traveling state is made as to contact with a wall, the degree of at least one of these factors can be the degree of a predetermined factor such as the distance to a wall, time to collision (TTC), or the type etc. of an object that may come into contact with the mobile robot 100.

The degree of abnormality can be either classified into a plurality of ranks such as rank A, rank B, and rank C with rank A being the qualitatively highest degree or quantitatively quantified in the range of 0.0 to 1.0, and can be used as the determination result. Alternatively, the degree of abnormality may be quantitatively quantified as described above and then classified into ranks, that is, into levels, by threshold processing, and may be used as the determination result. However, the present disclosure is not limited to these examples. For example, the degree of abnormality itself may be determined in advance for each predetermined area on the map data, or a weighting factor may be determined in advance for each area on the map data. In the case where a weighting factor is determined in advance for each area, the degree of abnormality can be quantitatively quantified as described above, and then the resultant numerical value can be lastly multiplied by the weighting factor for the area where the mobile robot 100 is currently located, and the multiplication result or the result of threshold processing of the multiplication result can be used as the determination result. Even an abnormality that should be addressed at a certain position is not always an abnormality that should be addressed at another position. It can therefore be said that it is beneficial to change the degree of abnormality according to the area of the current position of the mobile robot 100.

Although it is described above that the determination result may indicate the degree of abnormality, the determination result may indicate the degree of normality in a similar manner. That is, for example, the control computer 101 may quantitatively or qualitatively obtain the degree of normality and control light emission so that light is emitted in different light emission patterns depending on the degree of normality. The degree of normality can be the degree of safety. For example, the degree of normality can be determined so that the less likely a traveling abnormal is expected to occur, the higher the degree of normality indicated by the determination result is. Although the degree of abnormality and the degree of normality are described above separately, the determination result may indicate, for example, the degree of abnormality, and may indicate that there is no abnormality, namely may indicate "normal," when the degree of abnormality is the lowest. The boundary between normal and abnormal may be determined as desired in advance.

As described above, the light emission pattern can be changed according to the degree of abnormality or the degree of normality. For simplicity of description, an example in which the control computer 101 controls light emission so that light is emitted in different light emission patterns depending on whether there is an abnormality will be described below.

As part of the system control described above, the control computer 101 may control the first light-emitting unit 11 and the second light-emitting unit 12 to emit light in a first predetermined light emission pattern when the determination result indicates that there is an abnormality, and may control the first light-emitting unit 11 and the second light-emitting unit 12 to emit light in a second predetermined light emission pattern when the determination result indicates that the abnormality has been eliminated. The first predetermined light emission pattern and the second predetermined light emission pattern may be any patterns as long as they are different from each other. Hereinafter, the first predetermined light emission pattern and the second predetermined light emission pattern will be referred to as a first light emission pattern and a second light emission pattern, respectively.

For such control, the control computer 101 first determines the traveling state of the mobile robot 100 based on the detection results from sensors such as the sensor 105 (step S11). The mobile robot 100 can include in, for example, the control computer 101 a storage unit, not shown, configured to store information indicating the traveling state thus determined. The control computer 101 may determine the traveling state based on information indicating the most recently stored traveling state.

After step S11, the control computer 101 performs different processes depending on whether the determined traveling state indicates that the mobile robot 100 has a traveling abnormality (step S12).

When YES in step S12, that is, when the mobile robot 100 has a traveling abnormality, the control computer 101 stores information indicating the occurrence of the traveling abnormality in the storage unit (step S13). When the determined traveling state indicates there is the same traveling abnormality as in the previous determination, the date and time in this information need only be updated. However, this update itself may not be performed. The control computer 101 then controls the first light-emitting unit 11 and the second light-emitting unit 12 to emit light in the first light emission pattern as illustrated in, for example, "abnormality present" in FIG. 5 (step S14), and the process ends. The order of steps S13, S14 does not matter.

When NO in step S12, that is, when the mobile robot 100 does not have a traveling abnormality, the control computer 101 determines whether the traveling state has recovered from a traveling abnormality, based on information indicating the occurrences of traveling abnormalities and stored in the storage unit (step S15). When it is determined that the traveling state has recovered from a traveling abnormality, the control computer 101 stores information indicating that the traveling abnormality has been eliminated in the storage unit, or erases information indicating the occurrence of the previous traveling abnormality from the storage unit (step S16). The control computer 101 then controls the first light-emitting unit 11 and the second light-emitting unit 12 to emit light in the second light emission pattern different from the first light emission pattern, as illustrated in, for example, "abnormality eliminated" in FIG. 5 (step S17), and the process ends. The order of steps S16, S17 does not matter.

When it is not determined that the traveling state has recovered from a traveling abnormality, the control computer 101 controls the first light-emitting unit 11 and the second light-emitting unit 12 to emit light in a third light emission pattern different from the first light emission pattern and the second light emission pattern, as illustrated in, for example, "no abnormality present" in FIG. 5, in order to indicate that there has been no traveling abnormality (step S18), and the process ends. As described above, the first light-emitting unit 11 and the second light-emitting unit 12 may be controlled to emit light when there is no traveling abnormality. Alternatively, the first light-emitting unit 11 and the second light-emitting unit 12 may be turned off when there is no traveling abnormality. The above process can be repeated, for example, at predetermined intervals for determining the traveling state, or every time a change occurs in the detection results from the sensor 105 etc. that are used to determine the traveling state.

As shown in the examples of "no abnormality present," "abnormality present," and "abnormality eliminated" in FIG. 5, light emission in a plurality of light emission patterns corresponding to the traveling states, such as the first light emission pattern, the second emission pattern, and the third emission pattern, can be performed in the same light-emitting area. Although FIG. 5 illustrates an example in which this same light-emitting area is both the first light-emitting unit 11 and the second light-emitting unit 12, this same light-emitting area may be either the first light-emitting unit 11 or the second light-emitting unit 12. This allows the user to easily notice an abnormality and to easily notice that an abnormality has been eliminated, because the portion that usually emits light in a normal mode emits light in a different mode.

The light emission patterns to be used, such as the first light emission pattern, the second light emission pattern, and other light emission patterns that will be described later, may be stored in the form of, for example, a table in the control computer 101 so that they can be referred to during the light emission control.

The mobile robot 100 performs the light emission control according to the traveling state as described above. Accordingly, when a traveling abnormality associated with the traveling environment such as contact with a wall occurs, the mobile robot 100 can clearly notify the surroundings of the traveling abnormality state. When the traveling abnormality state is eliminated, the mobile robot 100 can also clearly notify the surroundings of the elimination of the traveling abnormality state. As used herein, the "surroundings" include not only surrounding people, but also a surveillance camera that will be described later as an environment camera. It can be said that the surveillance camera can also clearly capture images of the traveling state. As can be seen from the above description, the first light-emitting unit 11 and the second light-emitting unit 12 can function as indicators indicating the traveling state.

In the case where the light emission pattern is changed according to the degree of abnormality, the degree of abnormality is determined in at least a plurality of levels except when there is no abnormality, that is, except when the traveling state is normal. In such a case, the light emission pattern may be changed according to the degree of the abnormality that has been eliminated, or may be changed as the degree of abnormality increases or decreases.

As described above, the first light-emitting unit 11 is a light-emitting unit mounted around the contact portion that may contact a transport object when the transport object is loaded and transported. That is, in the mobile robot 100, the light-emitting units are mounted in consideration of the portion on which a transport object is to be loaded, as illustrated by the positional relationship between the first light-emitting unit 11 and the lifting stage. This contact can also be referred to as a loading surface. The first light-emitting unit 11 is provided around the contact portion on the body of the mobile robot 100. This contact portion is a portion that contacts a transport object when the loaded transport object is transported. For example, a portion that contacts a transport object only during loading before transport of the transport object can be excluded from the contact portion. The contact portion can be, for example, a contact portion that contacts the bottom surface of a transport object. Therefore, a portion that contacts a side surface of a transport object can be excluded from the contact portion. Although possible transport objects include various transport objects with various sizes and shapes, the contact portion that may contact a transport object can refer to a portion that has a possibility of being in contact with a transport object during transport of the transport object, such as the upper surface of the lifting mechanism 140. Therefore, when the loaded wagon 500 or other loaded transport object is being transported, light emitted from the first light-emitting unit 11 is visible, for example, at least from obliquely above the mobile robot 100 or from the side of the mobile robot 100. The mobile robot 100 is easily visible from the surroundings even when the mobile robot 100 has a transport object loaded thereon, and is even more easily visible from the surroundings when the mobile robot 100 does not have any transport object loaded thereon. It is therefore possible to clearly notify the surroundings of the mobile robot 100 of the traveling state. In the case where light is emitted from the area around the contact portion as in this example and the wagon 500 is used for transport, the wagon 500 may have a mirror lower surface to make the light emission more visible to the surroundings of the mobile robot 100.

As described above, the second light-emitting unit 12 is a light-emitting unit provided on or around a joystick device for operating the mobile robot 100. The light-emitting unit is mounted on the mobile robot 100 at a position high enough for the light-emitting unit to be easily visible from the operator or the surroundings, that is, at the operation position, as illustrated particularly by the second light-emitting unit 12. The mobile robot 100 can therefore clearly notify the surroundings of its traveling state even in a direction in which the loading position is less visible depending on the transport object such as the wagon 500.

As described above, the mobile robot 100 can include the sensor 105 that detects contact of an object with the outer periphery of the mobile robot 100. In this case, the traveling state is determined as follows. The control computer 101 determines that there is a traveling abnormality in the traveling state when the sensor 105 detects that an object is in contact with the mobile robot 100. The control computer 101 determines that there is no traveling abnormality in the traveling state when the sensor 105 does not detect that an object is in contact with the mobile robot 100.

With this configuration, the mobile robot 100 can clearly notify the surroundings that an object is in contact with the mobile robot 100, and can also clearly notify the surroundings when the object is no longer in contact with the mobile robot 100. The mobile robot 100 includes a sensor, such as the sensor 105, that detects contact of an object with the bumper installed on the outer periphery of the mobile robot 100. The bumper can thus protect the body of the mobile robot 100 and the object that has come into contact with the bumper. The abnormality state can be determined based on information not only from the sensor 105 but also from other sensors such as the camera 104 mounted on the mobile robot 100.

The control for changing the light emission pattern such as the first light emission pattern and the second light emission pattern can include control for changing at least one of the following: the brightness, hue, saturation, and lightness of light to be emitted from the light-emitting units such as the first light-emitting unit 11 and the second light-emitting unit 12. In an example in which the light-emitting units are mounted at a plurality of positions away from each other like the first light-emitting unit 11 and the second light-emitting unit 12, the control for changing the light emission pattern can include control for controlling the first light-emitting unit 11 and the second light-emitting unit 12 to emit light with different light emission parameters from each other. As used herein, the light emission parameter can be at least one of the following: brightness, hue, saturation, and lightness.

In the example in which the light-emitting units are mounted at a plurality of positions away from each other like the first light-emitting unit 11 and the second light-emitting unit 12, the control for changing the light emission pattern can include changing the position where light is to be emitted. In a certain light emission pattern, light emission can be controlled so that light is emitted at all the positions. In another light emission pattern, light emission can be controlled so that light is turned off at all the positions. For example, the control for changing the light emission pattern can include control for turning off either the first light-emitting unit 11 or the second light-emitting unit 12 and controlling only the other light-emitting unit to emit light, that is, control for turning on and off the light emission.

In the example in which the light-emitting units are mounted at a plurality of positions away from each other like the first light-emitting unit 11 and the second light-emitting unit 12, the control for changing the light emission pattern can include changing a plurality of positions where light is to be synchronously emitted. With such a configuration, the mobile robot 100 can more clearly notify the surroundings of the mobile robot 100 of its traveling state.

Examples of such a light emission pattern will be given below. In a certain light emission pattern, only the first light-emitting unit 11 is controlled to emit light. In another light emission pattern, only the second light-emitting unit 12 is controlled to emit light. In still another light emission pattern, the first light-emitting unit 11 and the second light-emitting unit 12 are synchronized to emit light. Examples of synchronizing the first light-emitting unit 11 and the second light-emitting unit 12 to emit light include the example of "no abnormality present" and the example of "abnormality eliminated" in FIG. 5. In an example in which the mobile robot 100 includes the light-emitting units at three or more positions, a light emission pattern can be selected from many light emission patterns obtained from various combinations of the three or more light-emission units.

Examples of controlling the first light-emitting unit 11 and the second light-emitting unit 12 to emit light without synchronizing them include the example of "abnormality present" in FIG. 5. In the example of "abnormality present" in FIG. 5, the first light-emitting unit 11 and the second light-emitting unit 12 are shown hatched in opposite directions, but such hatching is merely for convenience and indicates that they are different from each other only in phase. In the case where the first light-emitting unit 11 and the second light-emitting unit 12 are controlled to emit light alternately, this example can be regarded as an example in which the timing to turn on the first light-emitting unit 11 and the timing to turn off the second light-emitting unit 12 are synchronized. As described above, the control computer 101 can control, as a certain light emission pattern, light emission of the first light-emitting unit 11 and the second light-emitting unit 12 so that they emit light at alternate timings, namely so that they emit light alternately.

The control computer 101 need not necessarily control light emission so that the first light-emitting unit 11 and the second light-emitting unit 12 emit light at alternate timings. The control computer 101 may control, as a certain light emission pattern, the first light-emitting unit 11 and the second light-emitting unit 12 to emit light out of phase from each other. Light emission can thus be presented in various rhythms to the surroundings.

At a plurality of positions where light is synchronously emitted, light may be emitted in a light emission pattern having a mutually complementary relationship. The light emission pattern having a mutually complementary relationship can be a pattern in which the first light-emitting unit 11 and the second light-emitting unit 12 are controlled to emit light in colors that are easily visible when seen as a combination, such as a pattern in which the first light-emitting unit 11 and the second light-emitting unit 12 are controlled to emit light in complementary colors.

By using such various light emission patterns as described above, the mobile robot 100 can even more clearly notify the surroundings of the mobile robot 100 of its traveling state. For example, when there is no abnormality in the traveling state, the control computer 101 may reduce light emission to save power. When there is an abnormality in the traveling state, the control computer 101 may make light emission stand out to allow to further notify the surroundings of the occurrence of the traveling abnormality. The system control described above may include control for stopping the movement of the mobile robot 100 when the determination result of the traveling state indicates that there is a traveling abnormality. In other words, the control system may stop the movement of the mobile robot 100 when the determination result of the traveling state indicates that there is a traveling abnormality. Since the movement of the mobile robot 100 can be stopped when there is an abnormality in the traveling state, it is possible to prevent the worse from happening.

Figure 6:
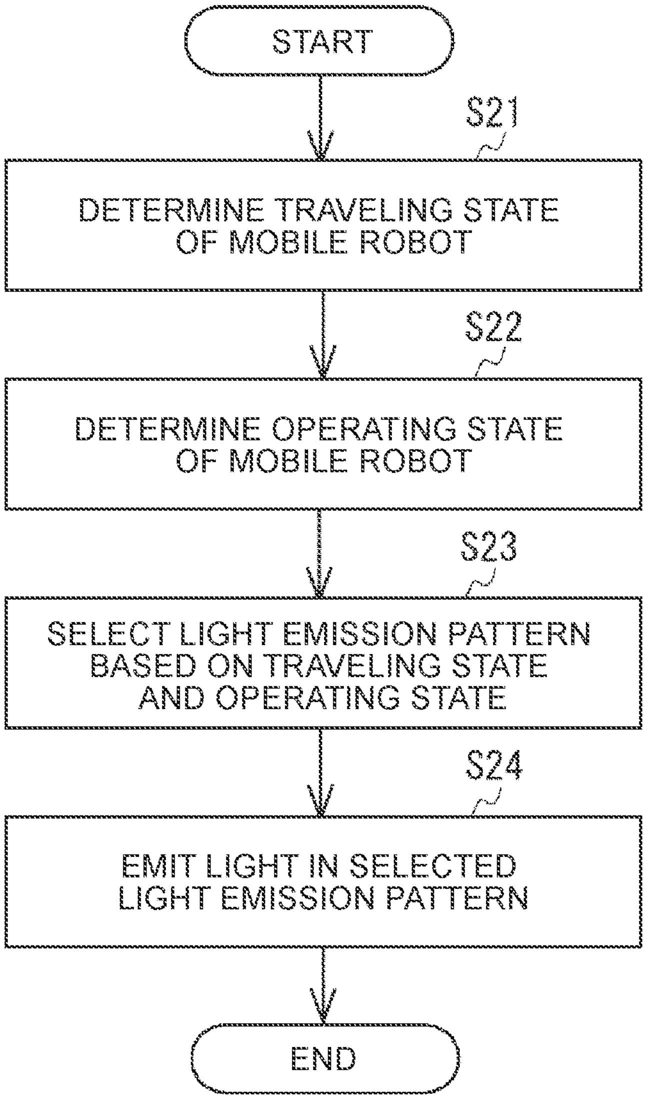
FIG. 6 is a flowchart illustrating another example of the light emission process that is performed by the mobile robot of FIG. 1.

Next, other examples of the light emission process that can be used in the present embodiment will be described with reference to FIGS. 6 to 8. FIG. 6 is a flowchart illustrating another example of the light emission process that is performed by the mobile robot 100. FIGS. 7 and 8 show other examples of the light emission patterns that can be implemented by the mobile robot 100.

The information that is used by the control computer 101 for the light emission control can include information other than the traveling state. An example in which the information that is used by the control computer 101 for the light emission control includes the operating state of the mobile robot 100 will be described below. Information indicating the operating state can be, for example, information indicating whether the mobile robot 100 is in the autonomous movement mode, is in the user operation mode, or has some kind of operational abnormality. As used herein, the operational abnormality refers to abnormalities other than the abnormality in the traveling state associated with the traveling environment of the mobile robot 100, and refers to various abnormalities of the mobile robot 100, such as a dead battery, an abnormality in a drive unit, and an abnormality in any wheel. An example will be given below in which, when there is an operational abnormality, light emission is controlled so that light is emitted in the same light emission pattern regardless of whether the mobile robot 100 is in the autonomous movement mode or the user operation mode. However, when there is an operational abnormality, light emission may be controlled so that light is emitted in different light emission patterns depending on whether the mobile robot 100 is in the autonomous movement mode or the user operation mode.

As in the case where the light emission pattern is changed according to the degree of abnormality or normality in the traveling state, the light emission pattern may also be changed according to the degree of abnormality or normality in the operating state. The degree of abnormality and the degree of normality in the operating state can also be obtained as a result of determination based on basically the same concept as that for the degree of abnormality and the degree of normality in the traveling state. Taking the remaining capacity of the battery as an example, the remaining charge level of the battery can be obtained as a degree of abnormality or normality. Taking either or both of the drive unit and the wheel(s) as an example, the current level of traveling performance can be obtained as a degree of abnormality or normality. Other types of operating states can be obtained based on the same concept.

When the operating state is also used for the light emission control, the control computer 101 determines the traveling state of the mobile robot 100 (step S21) as in step S11 of FIG. 4, and determines the operating state of the mobile robot 100 (step S22). The order of steps S21, S22 does not matter. In step S22, of the information indicating the operating state, information indicating whether the mobile robot 100 is in the autonomous movement mode or the user operation mode can be obtained by referring to the current movement mode in the control computer 101.

Information indicating whether there is an operational abnormality can be obtained by the control computer 101 performing information processing, image processing, etc. based on the detection results from various sensors mounted on the mobile robot 100 and determining whether there is an operational abnormality. The mobile robot 100 can include in, for example, the control computer 101 a storage unit, not shown, configured to store the information indicating the operating state thus acquired. In step S22, the control computer 101 can refer to the stored information indicating the operating state.

Like the determination of the traveling state, the determination of the operating state can be made by the control computer 101 performing information processing, image processing, etc. based on the detection results from the various sensors. The following description is given on the assumption that the determination is made in this way. Each sensor may perform such detection that the result of the detection indicates the determination result itself of the operating state, or may have a function to determine the operating state by performing information processing, image processing, etc. based on its sensing result. In that case, each sensor sends its determination result of the operating state to the control computer 101, and the control computer 101 can use the information received from each sensor as the determination result of the operating state. The determination of the operating state may be made by a determination unit provided separately from the control computer 101 that performs light emission control.

After steps S21, S22, the control computer 101 selects a light emission pattern based on the determined traveling state and operating state (step S23). Although not shown in FIG. 6, the determination of the traveling state in the process of FIG. 6 can also be made in the same manner as that described for the process of FIG. 4. The control computer 101 controls the first light-emitting unit 11 and the second light-emitting unit 12 to emit light in the selected light emission pattern (step S24), and the process ends. Such a process can be repeated, for example, every time a change occurs in the detection results from the sensor 105 etc. that are used to determine the traveling state or the operating state, or at predetermined intervals.

In steps S23, S24, the control computer 101 can select a light emission pattern and perform the light emission control in, for example, the following manner. An example will be given in which the process of FIG. 6 is repeated at predetermined intervals. For example, the control computer 101 can switch the correspondence to be referred to between the correspondence between the traveling states and the light emission patterns shown in FIG. 7 and the correspondence between the operating states and the light emission patterns shown in FIG. 8, every time the process is repeated, that is, every predetermined period indicated by the predetermined interval. For example, the control computer 101 controls the first light-emitting unit 11 and the second light-emitting unit 12 to emit light in a light emission pattern indicating the traveling state in steps S23, S24, based on the correspondence between the traveling states and the light emission patterns shown in FIG. 7. After the predetermined period, the control computer 101 controls the first light-emitting unit 11 and the second light-emitting unit 12 to emit light in a light emission pattern indicating the operating state in steps S23, S24, based on the correspondence between the operating states and the light emission patterns shown in FIG. 8.

In FIG. 7, the light emission patterns defined by the colors and turn-on patterns of light emission from the first light-emitting unit 11 and the second light-emitting unit 12 are shown for each of "no abnormality present," "abnormality present," and "abnormality eliminated" as in the example of FIG. 5. The turn-on pattern is selected from an always-on pattern in which light is constantly on, a flashing pattern in which light flashes at short intervals, and a flashing pattern in which light flashes at longer intervals. However, the intervals at which light flashes, that is, the flashing intervals, can also be set in three or more stages.

In FIG. 8, the light emission patterns defined by the colors and turn-on patterns of light emission from the first light-emitting unit 11 and the second light-emitting unit 12 are shown for each of the following cases: "autonomous movement mode and normal," "user operation mode and normal," and "operational abnormality." As used herein, "normal" indicates that the operating state is normal. As can be seen from the example of the light emission patterns shown in FIG. 8, the second light-emitting unit 12 near the operation unit 130 and the stick unit 131 mainly indicates the mode when the mobile robot 100 is normal and the operational abnormality, and the first light-emitting unit 11 indicates the detailed operating state of the mobile robot 100 in the autonomous movement mode.

As the detailed operating state in the autonomous movement mode, the case of "autonomous movement mode and normal" is divided into the following four cases in FIG. 8. In other words, in FIG. 8, the light emission patterns are shown for the following four cases: "traveling autonomously" indicating that the mobile robot 100 is moving autonomously, "on standby" indicating that the mobile robot 100 is under autonomous movement control but is stopped on standby, "prompt an operation" indicating a situation where the user is prompted to perform some kind of operation, and "alert" indicating a situation where some kind of alert is given to the user or the surroundings. The case of "on standby" can refer to, for example, the case where the mobile robot 100 is being charged with a charger or is waiting for an elevator. The case of "prompt an operation" can refer to, for example, the case where the mobile robot 100 has arrived at a transport destination. The case of "alert" can refer to, for example, the case where the lifting mechanism 140 is being raised or lowered or the case where the mobile robot 100 is approaching an intersection. The case of "traveling autonomously" refers to the case where the vehicle is traveling autonomously other than the cases described above.

FIG. 8 also shows an example of the turn-on patterns including a "breathing rhythm" in which brightness is changed in a rhythm similar to the rhythm of human breathing, and "sequential lighting" in which the light-emitting portions are turned on in a sequence. Examples of the sequential lighting include controlling the first light-emitting unit 11 to sequentially turn on the light-emitting portions around the lifting mechanism 140 and controlling the second light-emitting unit 12 to sequentially turn on the light-emitting portions around the stick unit 131.

As another example of the light emission control, light may be emitted in the light emission pattern shown in FIG. 7 in half of the area illustrated as the first light-emitting unit 11 and half of the area illustrated as the second light-emitting unit 12. In that case, light can be emitted in the light emission pattern shown in FIG. 8 in the other half of the area illustrated as the first light-emitting unit 11 and the other half of the area illustrated as the second light-emitting unit 12. Although an example is given in which each of the light-emitting areas of the first light-emitting unit 11 and the second light-emitting unit 12 is divided in half, the ratio of the divided light-emitting area is not limited to this, and the ratio of the divided light-emitting area may be different between the first light-emitting unit 11 and the second light-emitting unit 12.

As still another example of the light emission control, the first light-emitting unit 11 may be controlled to emit light in a light emission pattern according to the traveling state as shown in FIG. 7, and the second light-emitting unit 12 may be controlled to emit light in a light emission pattern according to the operating state as shown in FIG. 8. Alternatively, the first light-emitting unit 11 may be controlled to emit light in a light emission pattern according to the operating state as shown in FIG. 8, and the second light-emitting unit 12 may be controlled to emit light in a light emission pattern according to the traveling state as shown in FIG. 7.

Regarding the still another example of the light emission control, the control computer 101 may be configured to switch the light emission mode between a plurality of modes such as the mode in which light is emitted in the light emission patterns shown in FIG. 7 and the mode in which light is emitted in the light emission patterns shown in FIG. 8. In the mode in which light is emitted in the light emission patterns shown in FIG. 7, the light emission control is performed according to the traveling state. In the mode in which light is emitted in the light emission patterns shown in FIG. 8, the light emission control is performed according to the operating state. As yet another example of the light emission control, the light emission patterns shown in FIG. 7 may be used for the light emission control on the first light-emitting unit 11 and the second light-emitting unit 12, and the light emission patterns shown in FIG. 8 may be used for the light emission control on other two light-emitting portions provided at positions other than the first light-emitting unit 11 and the second light-emitting unit 12.

It should be noted that the examples of the colors and turn-on patterns shown in FIGS. 7 and 8 are applicable to such processing examples as described with reference to FIGS. 4 and 5.

The above description illustrates an example in which the transport system is mainly composed of the mobile robot 100. However, the control system according to the present embodiment may be any system as long as it performs system control for controlling a system including a mobile robot such as the transport system described above. This system may also include a server that is connectable to the mobile robot 100 via wireless communication. This server is a server that provides information for autonomous movement to the mobile robot 100. Since this server manages the mobile robot 100, it can also be referred to as a host management device. This server is not limited to a server configured as a single device, but may be constructed as a system in which functions are distributed between or among a plurality of devices.

Figure 9:
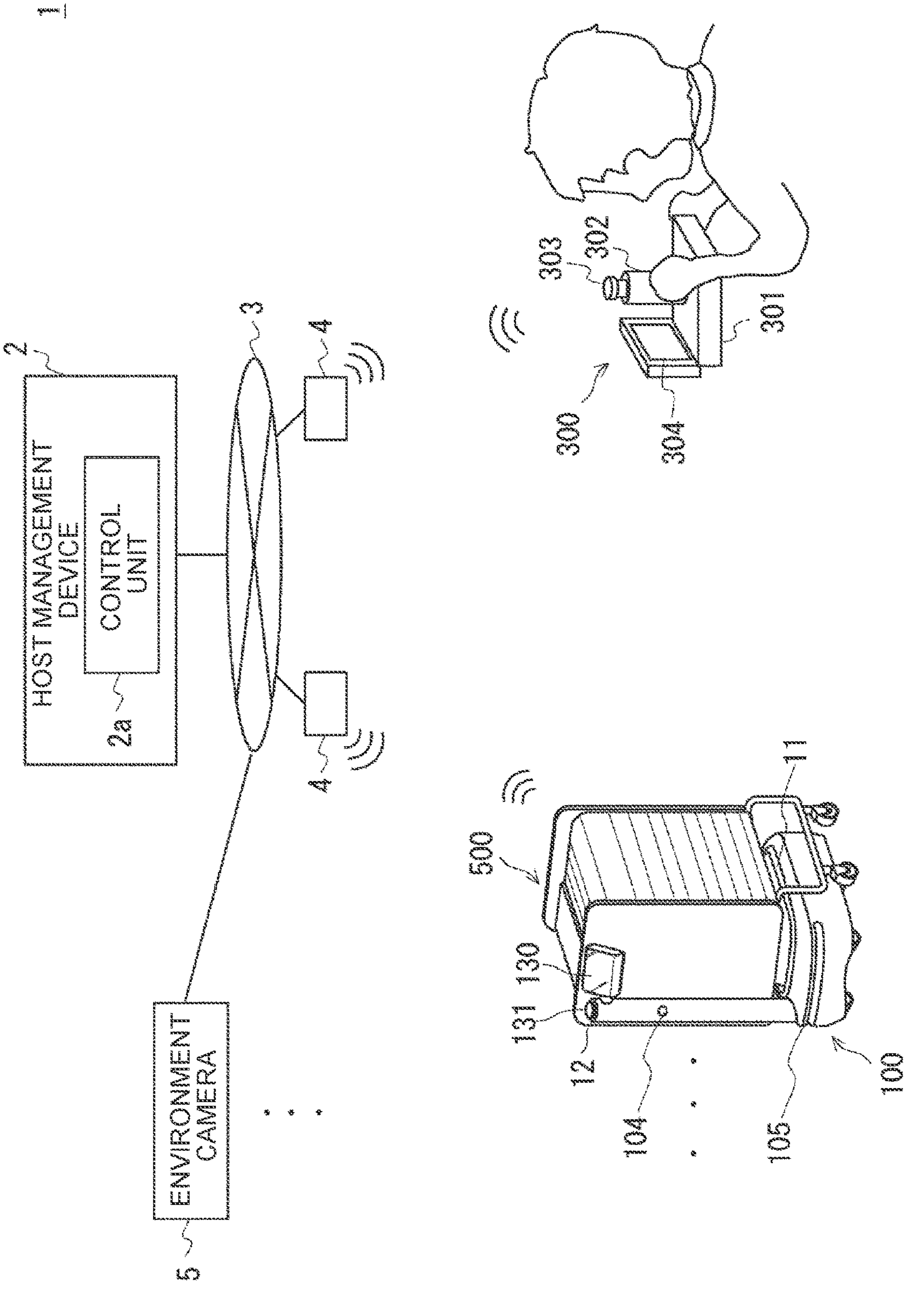
FIG. 9 is a schematic diagram showing an example of the overall configuration of a system including the mobile robot according to the embodiment.

An example in which this transport system includes the mobile robot 100 and the host management device will be described below with reference to FIG. 9. FIG. 9 is a schematic diagram showing an example of the overall configuration of the transport system including the mobile robot 100.

As shown in FIG. 9, the transport system 1 includes the mobile robot 100, a host management device 2, a network 3, a communication unit 4, an environment camera 5, and user equipment 300. The transport system 1 is a system for transporting an object by the mobile robot 100, and includes a control system in this configuration example. In this example, the control system can refer to the mobile robot 100 and the host management device 2, or to the components of control systems provided in the mobile robot 100 and the host management device 2.

The mobile robot 100 and the user equipment 300 are connected to the host management device 2 via the communication unit 4 and the network 3. The network 3 is a wired or wireless local area network (LAN) or wide area network (WAN). The host management device 2 and the environment camera 5 are connected to the network 3 by wire or wireless. As can be seen from this configuration, all of the mobile robot 100, the host management device 2, and the environment camera 5 include a communication unit. For example, the communication unit 4 is a wireless LAN unit installed in each environment. The communication unit 4 may be a general-purpose communication device such as a WiFi (registered trademark) router.

The host management device 2 is a device is connectable to the mobile robot 100 by wireless communication and is a management system that manages a plurality of mobile robots 100. The host management device 2 can include a control unit 2*a* for controlling the mobile robots 100. The control unit 2*a* can be implemented by, for example, integrated circuitry, and can be implemented by, for example, a processor such as a micro processor unit (MPU) or a central processing unit (CPU), a working memory, and a nonvolatile storage device. The function of the control unit 2*a* can be performed by the storage device storing a control program to be executed by the processor and the processor loading the program into the working memory and executing the program. The control unit 2*a* can be referred to as a control computer.

The transport system 1 can efficiently control the mobile robots 100 while autonomously moving the mobile robots 100 in the autonomous movement mode inside a predetermined facility. The "facility" can refer to various types of facilities including medical and welfare facilities such as hospitals, rehabilitation facilities, nursing homes, and residential care homes for the elderly, commercial facilities such as hotels, restaurants, office buildings, event venues, and shopping malls, and other complex facilities.

In order to perform such efficient control, a plurality of environment cameras 5 can be installed inside the facility. Each environment camera 5 acquires an image of the range in which a person or the mobile robot 100 moves, and outputs image data representing the image. This image data may be still image data or moving image data. In the case of the still image data, the still image data is obtained at each imaging interval. In the transport system 1, the host management device 2 collects the images acquired by the environment cameras 5 and information based on these images. As for the images that are used to control the mobile robots 100, the images etc. acquired by the environment cameras may be directly transmitted to the mobile robots 100, and in the user operation mode, may be transmitted to the user equipment 300 directly or via the host management device 2. The environment cameras 5 can be installed as surveillance cameras etc. in passages inside the facility or entrances to the facility.

The host management device 2 can determine, for each transport request, the mobile robot 100 to perform the transportation task, and can send to the determined mobile robot 100 an operation command to perform the transportation task. The mobile robot 100 can autonomously move from a transport origin to a transport destination according to the operation command. In this case, the method for determining a transport route etc. does not matter.

For example, the host management device 2 assigns the transport task to the mobile robot 100 located at or near the transport origin. Alternatively, the host management device 2 assigns the transport task to the mobile robot 100 heading toward or near the transport origin. The mobile robot 100 to which the task has been assigned moves to the transport origin to pick up a transport object.

The user equipment 300 is a device that remotely operates the mobile robot 100 via the host management device 2 or directly when in the user operation mode. The user equipment 300 can have a communication function for this remote operation, and can include a display unit 304. Various types of terminal equipment such as a tablet computer and a smartphone can be used as the user equipment 300. The user equipment 300 can also receive a switching operation of switching between the user operation mode and the autonomous movement mode. When this switching operation is performed, the mode of the mobile robot 100 is switched via the host management device 2.

An example will be given below in which the user equipment 300 includes a joystick device. The user equipment 300 can include a stick unit 302 and a button 303 as part of a joystick device, in addition to a body unit 301. The joystick device is a device that is operated to move the mobile robot 100 in a direction intended by the user when in the user operation mode. The joystick device can receive a directional operation when the stick unit 302 is tilted in a direction in which the user wants the mobile robot 100 to move. The joystick device can also be controlled to perform a select operation by depressing the button 303. The button 303 can also be used to perform the switching operation described above. The button 303 may be configured to serve as an emergency stop button when it is depressed for a predetermined period. In the case where a plurality of operations is assigned to the button 303, predetermined periods corresponding to the operations may be set for the button 303. In the case where the user equipment 300 includes the joystick device, the user can perform similar operations even when the mobile robot 100 does not include a joystick device. It is herein assumed that, in the configuration in which the transport system 1 manages a plurality of mobile robots 100, the mobile robot 100 to be remotely operated can be selected by the user equipment 300 when in the user operation mode.

The display unit 304 can display an image indicated by the image data received from the camera 104 of the mobile robot 100 and an image indicated by the image data received from the environment camera 5 located around the mobile robot 100. This allows the user to operate the mobile robot 100 using the stick unit 302 and the button 303.

The user equipment 300 can function as a device for sending a transport request etc. to the host management device 2. This transport request can also include information indicating a transport object.

The control system in the transport system 1 can perform the following determination process at least when the host management device 2 is unable to communicate with the mobile robot 100. In the case where the host management device 2 included in the control system is unable to communicate with the mobile robot 100, the host management device 2 can perform a determination process based on an image of the mobile robot 100 captured by the environment camera 5, namely can perform a determination process for determining the traveling state of the mobile robot 100 from the light emission pattern shown by the image. Instead of or in addition to the image captured by the environment camera 5, this image can be an image captured by a camera of another mobile robot included in the transport system 1.

In the control system of the transport system 1 having such a configuration, the host management device 2 can determine whether a traveling abnormality associated with the traveling environment has occurred, even when the mobile robot 100 and the host management device 2 are unable to communicate with each other.

Accordingly, for example, when the mobile robot 100 that is unable to communicate has a traveling abnormality, the user can be instructed to manually move the mobile robot 100 or to collect or inspect the mobile robot 100, etc., and the user can perform the work according to the instruction.

A method in which the mobile robot 100 determines whether there is a traveling abnormally will be described. In the transport system 1 as well, the mobile robot 100 can determine whether there is a traveling abnormality by the same method as described with reference to FIG. 1 etc.

As another determination method, the mobile robot 100 may determine whether there is a traveling abnormality from an image captured by the environment camera 5 and sent to the mobile robot 100 directly or via the host management device 2. An image captured by a camera of another mobile robot rather than the environment camera 5 may be used for the determination. In other words, the control computer 101 can determine whether there is a traveling abnormality, based on an image captured by a camera installed in a facility where the mobile robot 100 is used, such as the environment camera 5 or the camera of another mobile robot. The control unit 2*a* of the host management device 2 can also make such a determination. In this case, information indicating the traveling state is preferably sent in advance to the mobile robot 100 in case wireless communication with the host management device 2 is interrupted.

Even in the configuration in which the mobile robot 100 acquires the information indicating the traveling state from the host management device 2, the mobile robot 100 can acquire this information before communication with the host management device 2 is interrupted. Therefore, the mobile robot 100 can perform the light emission control according to the information obtained before communication is interrupted.

Figure 10:
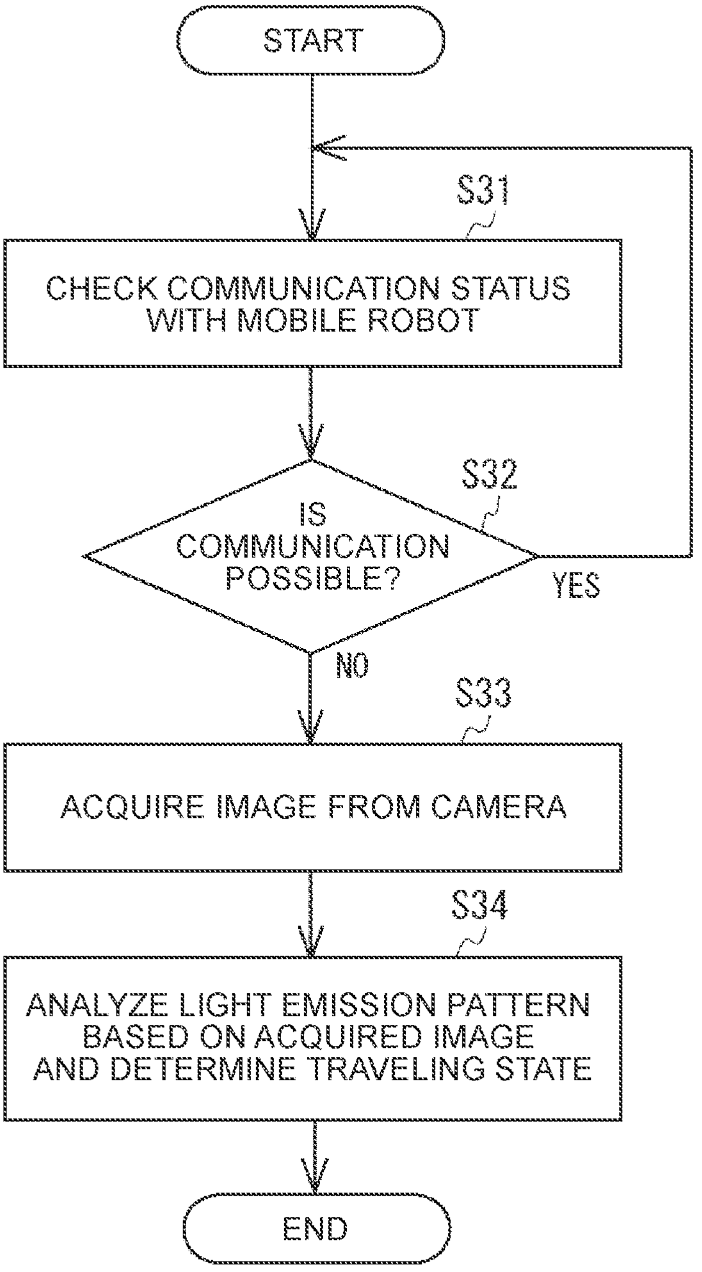
FIG. 10 is a flowchart illustrating an example of a process that is performed by a host management device in the system of FIG. 9.

An example of a process that is performed by the host management device 2 of the transport system 1 will be described with reference to FIG. 10. FIG. 10 is a flowchart illustrating an example of the process that is performed by the host management device 2 of the transport system 1 in FIG. 9.

First, the control unit 2*a* of the host management device 2 monitors the communication unit, not shown, to check the communication status with the mobile robot 100 (step S31), and determines whether communication with the mobile robot 100 is possible (step S32). When the control unit 2*a* determines that communication with the mobile robot 100 is possible, the process returns to step S31 and continues to monitor the communication unit. When the control unit 2*a* determines that communication with the mobile robot 100 is not possible, the control unit 2*a* acquires an image from the camera (step S33). This camera can be the environment camera 5, the camera installed in another mobile robot traveling near the position where communication with the mobile robot 100 is interrupted, or both of them.

The control unit 2*a* then analyzes the light emission pattern of the mobile robot 100 based on the acquired image and determines the traveling state (step S34), and the process ends. The control unit 2*a* may be configured to obtain the traveling state from the image by using a learning model obtained through machine learning, when analyzing the light emission pattern and determining the traveling state.

As described above, even when communication between the mobile robot 100 and the host management device 2 is not possible, the host management device 2 of the control system of the transport system 1 can determine the traveling state presented by the light emission pattern of the mobile robot 100.

In the configuration in which the mobile robot 100 can indicate its operating state by the light emission pattern, this system control can include control for determining the operating state of the mobile robot 100 from the light emission pattern shown in the image. Accordingly, for example, when the mobile robot 100 that is unable to communicate has an operational abnormality, the user can be instructed to collect or inspect the mobile robot 100, etc., and the user can perform the work according to the instruction. In this case as well, the control unit 2*a* may be configured to obtain the traveling state and the operating state from the image by using a learning model obtained through machine learning, when analyzing the light emission pattern and determining the traveling state and the operating state.

Even in a configuration in which the transport system does not include the host management device 2, the transport system can include the environment cameras 5 that are wirelessly communicable with the mobile robot 100. Even in such a configuration example, the abnormality state etc. of the mobile robot 100 can be similarly determined from the images obtained from the environment cameras 5. When the mobile robot 100 is communicable with other mobile robots, the abnormality state etc. of the mobile robot 100 such as contact with an object can be determined based on the images acquired by cameras mounted on the other mobile robots.

Figure 11:
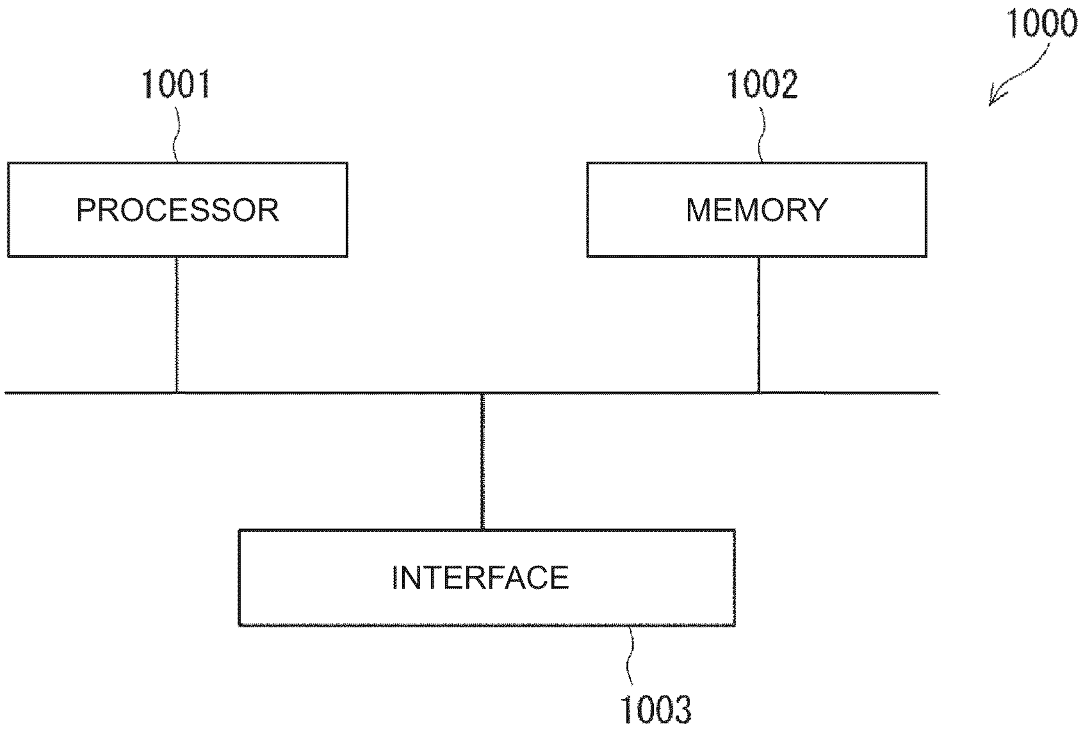
FIG. 11 shows an example of the hardware configuration of a device.

Each of the control computer 101 of the mobile robot 100, the host management device 2, and the user equipment 300 according to the above embodiment can have, for example, the following hardware configuration. FIG. 11 shows an example of the hardware configuration of each device.

A device 1000 shown in FIG. 11 can include a processor 1001, a memory 1002, and an interface 1003. The interface 1003 can include, for example, a communication interface, an interface with a drive unit, a sensor, an input and output device, etc. as necessary by the individual device.

The processor 1001 may be, for example, an MPU, a CPU, or a graphics processing unit (GPU). The processor 1001 may include a plurality of processors. The memory 1002 is, for example, a combination of a volatile memory and a nonvolatile memory. The functions of each device are implemented by the processor 1001 reading a program stored in the memory 1002 and executing the program while sending and receiving necessary information via the interface 1003.

The program includes a group of instructions (or software codes) for causing the computer to perform one or more of the functions described in the embodiment when loaded into the computer. The program may be stored in a non-transitory computer-readable medium or a tangible storage medium. Examples of the computer-readable medium or the tangible storage medium include, but are not limited to, a random-access memory (RAM), a read-only memory (ROM), a flash memory, a solid-state drive (SSD), and other memory technologies, a compact disc read-only memory (CD-ROM), a digital versatile disc (DVD), a Blu-ray (registered trademark) disc, and other optical disc storages, and a magnetic cassette, a magnetic tape, a magnetic disk storage, and other magnetic storage devices. The program may be transmitted on a transitory computer-readable medium or a communication medium. Examples of the transitory computer-readable medium or the communication medium include, but are not limited to, propagating signals in electrical, optical, acoustic, or other forms.

The present disclosure is not limited to the embodiment described above, and may be modified as appropriate without departing from the spirit and scope of the disclosure.

What is claimed is:

1. A system comprising an autonomously movable mobile robot that includes a control computer, wherein the mobile robot includes light-emitting units; and the control computer is configured to:

determine a traveling state of the mobile robot associated with a traveling environment of the mobile robot, control the light-emitting units to emit light in different light emission patterns depending at least on whether a determination result of the traveling state indicates that there an abnormality or that there is no abnormality, and stop movement of the mobile robot in response to the determination result indicating that there is the abnormality, wherein the mobile robot includes:

(a) a platform that includes a lifting stage, a part of the lifting stage being housed inside the platform, the lifting stage having a loading surface that is configured to contact a lower surface of a transport object that is to be transported by the mobile robot to support the transport object from below the transport object, the lifting stage being controlled by the control computer to raise and lower the loading surface to load and unload the transport object, and (b) a stand that projects upwardly from the platform and includes a control member configured to be operated by a user of the mobile robot, and wherein the light-emitting units include a first light-emitting unit and a second light-emitting unit, the first light-emitting unit is disposed on the platform at a position surrounding and adjacent to the lifting stage, and the second light-emitting unit is disposed on the stand at a position surrounding and adjacent to the control member, the control computer is configured to control the first light-emitting unit to emit light in an alert light emission pattern in response to the lifting stage being raised or lowered while in autonomous movement mode, the alert light emission pattern being different from the light emission patterns that are emitted (1) in response to the determination result indicating that there is the abnormality and (2) in response to the determination result indicating that there is no abnormality while the mobile robot is moving autonomously in the autonomous movement mode, and the control computer is configured to control the second light-emitting unit to emit light in a same light emission pattern in response to the determination result indicating that there is no abnormality while the mobile robot is in the autonomous movement mode.

2. The system according to claim 1, wherein:

the system computer is configured to control the second light-emitting unit to emit light in a first predetermined light emission pattern when the determination result indicates that there is the abnormality; and the system computer is configured to control the second light-emitting unit to emit light in a second predetermined light emission pattern when the determination result indicates that the abnormality has been eliminated.

3. The system according to claim 1, wherein:

the mobile robot includes a sensor configured to detect contact of an object with an outer periphery of the mobile robot; and the system computer is configured to determine that there is the abnormality in the traveling state when the sensor detects that the object is in contact with the mobile robot, and is configured to determine that there is no abnormality in the traveling state when the sensor does not detect that the object is in contact with the mobile robot.

4. The system according to claim 3, wherein the sensor is configured to detect contact of the object with a bumper installed on the outer periphery of the mobile robot.

5. The system according to claim 1, wherein:

the system includes a server that is connectable to the mobile robot via wireless communication; and the server is configured to, at least when the server is unable to communicate with the mobile robot, determine, based on an image of the mobile robot captured by a camera, the traveling state of the mobile robot from a light emission pattern shown by the image.

6. A control method for controlling a system that includes an autonomously movable mobile robot that includes (a) a control computer, (b) a platform that includes a lifting stage, a part of the lifting stage being housed inside the platform, the lifting stage having a loading surface that is configured to contact a lower surface of a transport object that is to be transported by the mobile robot to support the transport object from below the transport object, the lifting stage being controlled by the control computer to raise and lower the loading surface to load and unload the transport object, (c) a stand that projects upwardly from the platform and includes a control member configured to be operated by a user of the mobile robot, and (d) light-emitting units that include a first light-emitting unit and second light-emitting unit, the first light-emitting unit being disposed on the platform at a position surrounding and adjacent to the lifting stage, and the second light-emitting unit being disposed on the stand at a position surrounding and adjacent to the control member, the control method being executed by the control computer and comprising:

determining a traveling state of the mobile robot associated with a traveling environment of the mobile robot;

controlling the light-emitting units to emit light in different light emission patterns depending at least on whether a determination result of the traveling state indicates that there is an abnormality or that there is no abnormality, and stopping movement of the mobile robot in response to the determination result indicating that there is the abnormality, wherein the method further includes the control computer controlling the first light-emitting unit to emit light in an alert light emission pattern in response to the lifting stage being raised or lowered while in autonomous movement mode, the alert light emission pattern being different from the light emission patterns that are emitted (1) in response to the determination result indicating that there is the abnormality and (2) in response to the determination result indicating that there is no abnormality while the mobile robot is moving autonomously in the autonomous movement mode, and controlling the second light-emitting unit to emit light in a same light emission pattern in response to the determination result indicating that there is no abnormality while the mobile robot is in the autonomous movement mode.

7. The control method according to claim 6, further comprising the control computer controlling the second light-emitting unit to emit light in a first predetermined light emission pattern when the determination result indicates that there is the abnormality, and controlling the second light-emitting unit to emit light in a second predetermined light emission pattern when the determination result indicates that the abnormality has been eliminated.

8. The control method according to claim 6, wherein the mobile robot includes a sensor configured to detect contact of an object with an outer periphery of the mobile robot, the control method further comprising the control computer determining that there is the abnormality in the traveling state when the sensor detects that the object is in contact with the mobile robot, and determining that there is no abnormality in the traveling state when the sensor does not detect that the object is in contact with the mobile robot.

9. The control method according to claim 8, wherein the sensor is configured to detect contact of the object with a bumper installed on the outer periphery of the mobile robot.

10. The control method according to claim 6, wherein the system includes a server that is connectable to the mobile robot via wireless communication, the control method further comprising the server, at least when the server is unable to communicate with the mobile robot, determining, based on an image of the mobile robot captured by a camera, the traveling state of the mobile robot from a light emission pattern shown by the image.

11. A non-transitory storage medium storing instructions that are executable by one or more processors and that cause the one or more processors to perform a process of controlling a system that includes an autonomously movable mobile robot that includes (a) the one or more processors, (b) a platform that includes a lifting stage, a part of the lifting stage being housed inside the platform, the lifting stage having a loading surface that is configured to contact a lower surface of a transport object that is to be transported by the mobile robot to support the transport object from below the transport object, the lifting stage being controlled by the one or more processors to raise and lower the loading surface to load and unload the transport object, (c) a stand that projects upwardly from the platform and includes a control member configured to be operated by a user of the mobile robot, and (d) light-emitting units that include a first light-emitting unit and a second light-emitting unit, the process being executed by the one or more processors and comprising:

a determination process of determining a traveling state of the mobile robot associated with a traveling environment of the mobile robot, a light emission process of controlling the light-emitting units to emit light in different light emission patterns depending at least on whether a determination result of the traveling state in the determination process indicates that there is an abnormality or that there is no abnormality, and a stopping process of stopping movement of the mobile robot in response to the determination result indicating that there is the abnormality, wherein the light emission process further includes controlling the first light-emitting unit to emit light in an alert light emission pattern in response to the lifting stage being raised or lowered while in autonomous movement mode, the alert light emission pattern being different from the light emission patterns that are emitted (1) in response to the determination result indicating that there is the abnormality and (2) in response to the determination result indicating that there is no abnormality while the mobile robot is moving autonomously in the autonomous movement mode, and controlling the second light-emitting unit to emit light in a same light emission pattern in response to the determination result indicating that there is no abnormality while the mobile robot is in the autonomous movement mode.

12. The non-transitory storage medium according to claim 11, wherein the light emission process includes controlling the second light-emitting unit to emit light in a first predetermined light emission pattern when the determination result indicates that there is the abnormality, and controlling the second light-emitting unit to emit light in a second predetermined light emission pattern when the determination result indicates that the abnormality has been eliminated.

13. The non-transitory storage medium according to claim 11, wherein:

the mobile robot includes a sensor configured to detect contact of an object with an outer periphery of the mobile robot; and the determination process includes determining that there is the abnormality in the traveling state when the sensor detects that the object is in contact with the mobile robot, and determining that there is no abnormality in the traveling state when the sensor does not detect that the object is in contact with the mobile robot.

14. The non-transitory storage medium according to claim 13, wherein the sensor is configured to detect contact of the object with a bumper installed on the outer periphery of the mobile robot.

15. The non-transitory storage medium according to claim 11, wherein:

the system includes a server that is connectable to the mobile robot via wireless communication; and the determination process includes at least when the server is unable to communicate with the mobile robot, the server determining, based on an image of the mobile robot captured by a camera, the traveling state of the mobile robot from a light emission pattern shown by the image.

16. The system according to claim 1, wherein the control computer determines whether or not there is the abnormality by:

(i) quantitatively quantifying a degree of abnormality based on the traveling state that was determined, (ii) classifying the quantitatively quantified degree of abnormality into a level by threshold processing, the level being represented by a numerical value, (iii) obtaining the determination result by multiplying the numerical value by a weighting factor that is selected, based on a current location of the mobile robot, from a plurality of weighting factors determined in advance for each of a plurality of predetermined areas in map data, and (iv) comparing the determination result to a predetermined boundary.

17. The control method according to claim 6, wherein determining whether or not there is the abnormality includes the control computer:

(i) quantitatively quantifying a degree of abnormality based on the traveling state that was determined, (ii) classifying the quantitatively quantified degree of abnormality into a level by threshold processing, the level being represented by a numerical value, (iii) obtaining the determination result by multiplying the numerical value by a weighting factor that is selected, based on a current location of the mobile robot, from a plurality of weighting factors determined in advance for each of a plurality of predetermined areas in map data, and (iv) comparing the determination result to a predetermined boundary.

18. The non-transitory storage medium according to claim 11, wherein the instructions cause the one or more processors to determine whether or not there is the abnormality by:

(i) quantitatively quantifying a degree of abnormality based on the traveling state that was determined, (ii) classifying the quantitatively quantified degree of abnormality into a level by threshold processing, the level being represented by a numerical value, (iii) obtaining the determination result by multiplying the numerical value by a weighting factor that is selected, based on a current location of the mobile robot, from a plurality of weighting factors determined in advance for each of a plurality of predetermined areas in map data, and (iv) comparing the determination result to a predetermined boundary.

* * * * *